(12) United States Patent
Miller et al.

(10) Patent No.: US 12,448,925 B2
(45) Date of Patent: Oct. 21, 2025

(54) SYSTEM AND METHOD FOR DETECTING AND REDUCING TORQUE IN A TURBINE ENGINE

(71) Applicants: General Electric Company, Schenectady, NY (US); GE Avio S.r.l., Rivalta di Torino (IT)

(72) Inventors: Brandon Wayne Miller, Middletown, OH (US); Andrew Hudecki, Milford, OH (US); Kevin Richard Graziano, Cincinnati, OH (US); Arthur William Sibbach, Boxford, MA (US); Inenhe Mohammed Khalid, Hamilton, OH (US); Andrea Piazza, Turin (IT); Stefan Joseph Cafaro, Chapel Hill, NC (US)

(73) Assignees: General Electric Company, Schenectady, NY (US); GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 18/671,084

(22) Filed: May 22, 2024

(65) Prior Publication Data
US 2025/0084799 A1    Mar. 13, 2025

Related U.S. Application Data

(60) Provisional application No. 63/537,393, filed on Sep. 8, 2023.

(51) Int. Cl.
*F02C 9/58* (2006.01)
*F02C 7/36* (2006.01)

(52) U.S. Cl.
CPC .......... *F02C 9/58* (2013.01); *F02C 7/36* (2013.01); *F05D 2220/36* (2013.01); *F05D 2260/40311* (2013.01); *F05D 2270/052* (2013.01)

(58) Field of Classification Search
CPC .......... F02C 9/58; F02C 7/36; F05D 2220/36; F05D 2260/40311; F05D 2270/052
See application file for complete search history.

(56) References Cited

U.S. PATENT DOCUMENTS

| | | | |
|---|---|---|---|
| 2,678,698 A | * | 5/1954 | Lee, II .................... F02D 29/00 60/39.281 |
| 3,152,444 A | | 10/1964 | Peczkowski et al. |
| 7,100,378 B2 | | 9/2006 | Matthews |
| 8,352,149 B2 | | 1/2013 | Meacham |
| 8,566,000 B2 | | 10/2013 | Lickfold et al. |

(Continued)

*Primary Examiner* — Nathaniel E Wiehe
*Assistant Examiner* — Joshua R Beebe
(74) *Attorney, Agent, or Firm* — Smith Gambrell & Russell LLP

(57) ABSTRACT

A gas turbine engine includes a fan section having a fan rotatable with a fan shaft, a turbomachinery section having a turbine and a turbomachine shaft rotatable with the turbine, a power gearbox mechanically coupled to the fan shaft and the turbomachine shaft such that the fan shaft is rotatable by the turbomachine shaft across the power gearbox, a grounded structure coupled to and supporting the power gearbox, and a torque monitoring system. The torque monitoring system includes a gearbox sensor. The gearbox sensor is coupled to the grounded structure and the torque monitoring system configured to determine a torque across the power gearbox using the gearbox sensor.

20 Claims, 10 Drawing Sheets

(56) References Cited

U.S. PATENT DOCUMENTS

| | | |
|---|---|---|
| 9,470,152 B2 | 10/2016 | MacDonald et al. |
| 9,545,903 B2 | 1/2017 | Rehfus et al. |
| 10,047,678 B2 | 8/2018 | Certain |
| 10,180,078 B2 | 1/2019 | Roach et al. |
| 10,316,689 B2 | 6/2019 | Fletcher |
| 10,465,554 B2 | 11/2019 | MacDonald |
| 10,968,769 B2 | 4/2021 | Coooper |
| 11,236,635 B2 | 2/2022 | Wilson et al. |
| 11,333,035 B2 | 5/2022 | Ahmad et al. |
| 11,499,484 B2 | 11/2022 | Crowe et al. |
| 2009/0064654 A1 | 3/2009 | Kirzhner et al. |
| 2011/0229319 A1* | 9/2011 | Bacic ............... B64C 11/44 416/18 |
| 2018/0171816 A1* | 6/2018 | Moniz ............... F01D 17/04 |
| 2020/0088595 A1* | 3/2020 | Razak ............... F01D 17/04 |
| 2020/0131918 A1 | 4/2020 | Calderon et al. |
| 2022/0349318 A1* | 11/2022 | Nowoisky ............ F01D 21/14 |

* cited by examiner

SYSTEM AND METHOD FOR DETECTING AND REDUCING TORQUE IN A TURBINE ENGINE

CROSS-REFERENCE TO RELATED APPLICATIONS

This application is a non-provisional application claiming the benefit of priority under 35 U.S.C. § 119 (e) to U.S. Provisional Application No. 63/537,393, filed Sep. 8, 2023, which is hereby incorporated by reference in its entirety.

FIELD

The present disclosure relates to systems and methods for detecting and reducing torque in a turbine engine.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

The fan of the gas turbine engine is typically driven by a shaft or spool coupled to a turbine within the turbine section of the gas turbine engine. For certain gas turbine engines, a power gearbox is provided, with the spool driving the fan across the power gearbox. Such a drive system may allow for the turbine to turn at increased rotational speeds, while still allowing for a relatively efficient fan rotational speed.

Conventional gas turbine engines include sensors for determining torque across the power gearbox. However, such torque sensors are large, requiring larger power gearboxes that are difficult to integrate. Accordingly, improved systems for detecting and reducing torque in gas turbine engines are desirable.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
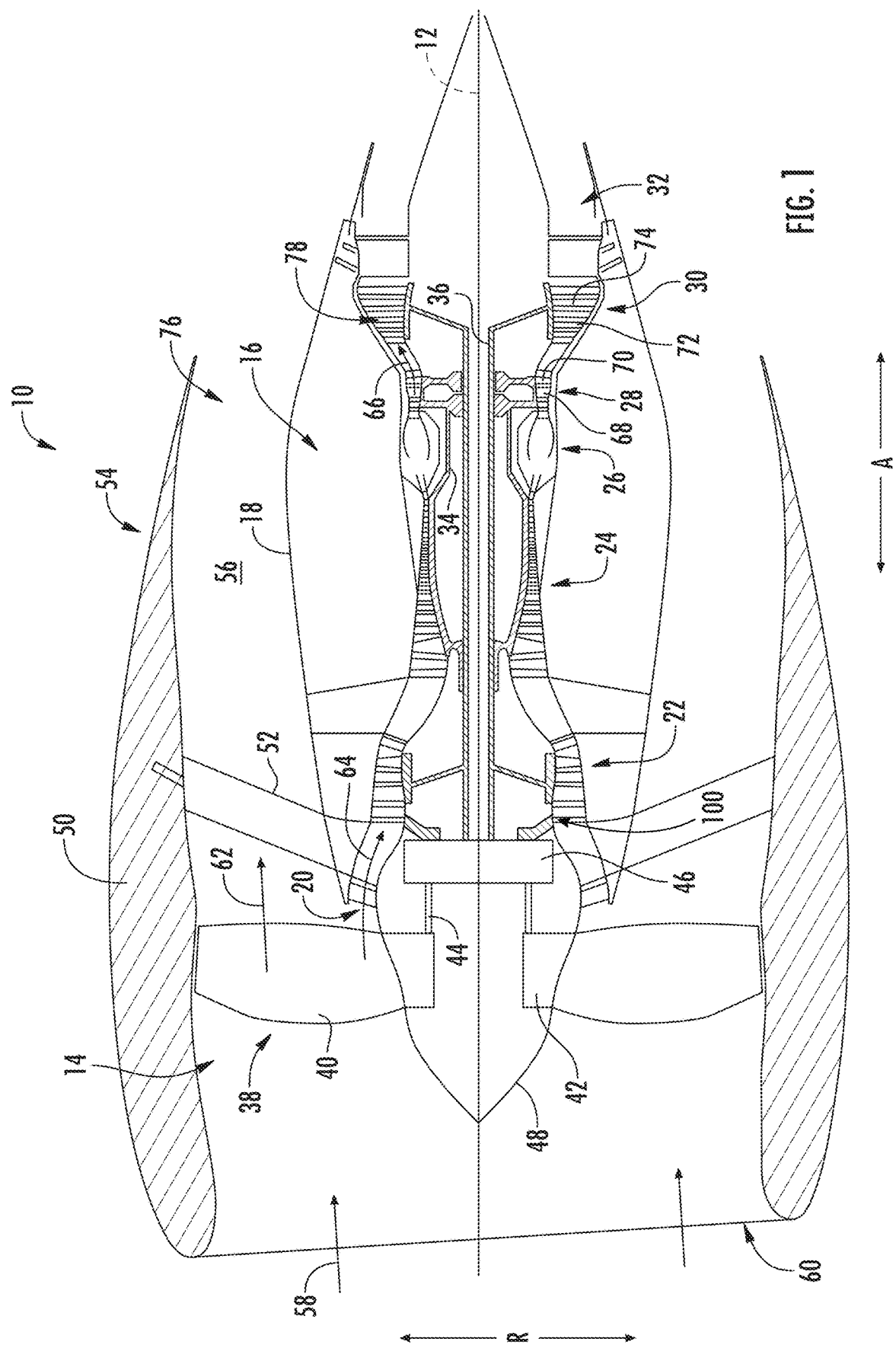
FIG. 1 is a schematic cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, and C" refers to only A, only B, only C, or any combination of A, B, and C.

The term "turbine engine" refers to an engine having a turbomachine as all or a portion of its power source. Example turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, a "bypass ratio" of a turbine engine is a ratio of bypass air through a bypass of the turbine engine to core air through a core inlet of a turbomachine of the turbine engine. For example, the bypass ratio is a ratio of bypass air entering the bypass airflow passage to core air entering the turbomachine.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

For purposes of the description hereinafter, the terms "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting a second wall/surface).

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

The present disclosure is generally related to systems and methods for detecting and reducing torque in gas turbine engines. Conventional gas turbine engines include sensors for determining torque across the power gearbox. If the torque across the power gearbox is not limited, a large overload torque factor requires a much larger power gearbox. However, larger power gearboxes are difficult to integrate, are heavier, and have an increased surface area that leads to higher heat loads. Additionally, conventional torque sensing approaches are based on rotation sensing. These rotation-based torque sensors are large and require sensing in a rotating frame of reference.

Determining torque across the power gearbox based on a static frame allows for a smaller sensor and, thus, a smaller power gearbox. For example, a sensor may be provided adjacent a static side of the power gearbox to measure the torque being reacted by the power gearbox stator side. Such a torque measurement does not require a sensor between a rotating interface and a static interface.

Referring now to the drawings, FIG. 1 is a schematic cross-sectional view of a gas turbine engine 10 in accordance with an exemplary aspect of the present disclosure. As shown in FIG. 1, the gas turbine engine 10 defines an axial direction A (extending parallel to a longitudinal centerline 12 provided for reference), a radial direction R, and a circumferential direction (i.e., a direction extending about the axial direction A). In general, the gas turbine engine 10 includes a fan section 14 and a turbomachinery section 16 disposed downstream from the fan section 14.

The exemplary turbomachinery section 16 depicted generally includes a substantially tubular outer casing 18 that defines an annular inlet 20. The outer casing 18 encases, in serial flow relationship, a compressor section including a booster or low pressure compressor ("LPC") 22 and a high pressure compressor ("HPC") 24; a combustion section 26; a turbine section including a high pressure turbine ("HPT") 28 and a low pressure turbine ("LPT") 30; and a jet exhaust nozzle section 32. A high pressure ("HP") shaft or spool, such as HP shaft 34, drivingly connects the HPT 28 to the HPC 24. A low pressure ("LP") shaft or spool, such as LP shaft 36, drivingly connects the LPT 30 to the LPC 22.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Additionally, the fan 38 may be configured as a fixed-pitch fan, such that each of the fan blades 40 are fixed relative to a pitch axis of the respective fan blade 40, or a variable pitch fan, such that one or more of the fan blades 40 are rotatable or moveable relative to the pitch axis of the respective fan blade 40. Notably, the disk 42 is, in turn, attached to and rotatable by a fan shaft 44, such that the fan blades 40, disk 42 and fan shaft 44 are together rotatable about the longitudinal centerline 12 by LP shaft 36 across a power gearbox 46. The power gearbox 46 includes a plurality of gears for stepping down a rotational speed of the fan shaft 44 to a more efficient rotational fan speed relative to the LP shaft 36. It should be appreciated, however, that as used herein, the term "shaft" or "spool" does not necessarily require a cylindrical member, and instead may refer to any rotatable structure extending generally along the axial direction A for driving a component of the gas turbine engine 10. The power gearbox 46 may be at least partially supported by a forward frame of the gas turbine engine 10, such as a forward frame 100.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachinery section 16. It should be appreciated that the nacelle 50 is supported relative to the turbomachinery section 16 by a plurality of circumferentially spaced outlet guide vanes 52. Moreover, a downstream section 54 of the nacelle 50 extends over an outer portion of the turbomachinery section 16 so as to define a bypass airflow passage 56 therebetween.

During operation of the gas turbine engine 10, a volume of air 58 enters the gas turbine engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LPC 22. The ratio between the first portion of air 62 and the second portion of air 64 is commonly known as a bypass ratio. The pressure of the second portion of air 64 is then increased as it is routed through the HPC 24 and into the combustion section 26, where it is mixed with fuel and burned to provide combustion gases 66.

The combustion gases 66 are routed through the HPT 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, which supports operation of the HPC 24. The combustion gases 66 are then routed through the LPT 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, which supports operation of the LPC 22 and/or rotation of the fan 38.

The combustion gases 66 are subsequently routed through the jet exhaust nozzle section 32 of the turbomachinery section 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HPT 28, the LPT 30, and the jet exhaust nozzle section 32 at least partially define a hot gas path 78 for routing the combustion gases 66 through the turbomachinery section 16.

It will be appreciated, however, that the exemplary, single rotor, ducted engine depicted in FIG. 1 is by way of example only, and that in other exemplary embodiments, the gas turbine engine 10 may have any other suitable configuration, including, for example, any other suitable number of shafts or spools, turbines, compressors, etc. Additionally, or alternatively, in other exemplary embodiments, any other suitable gas turbine engine may be provided. For example, in other exemplary embodiments, the gas turbine engine may be an open rotor engine, a turbofan engine, a turboshaft engine, a turboprop engine, turbojet engine, etc.

Figure 2:
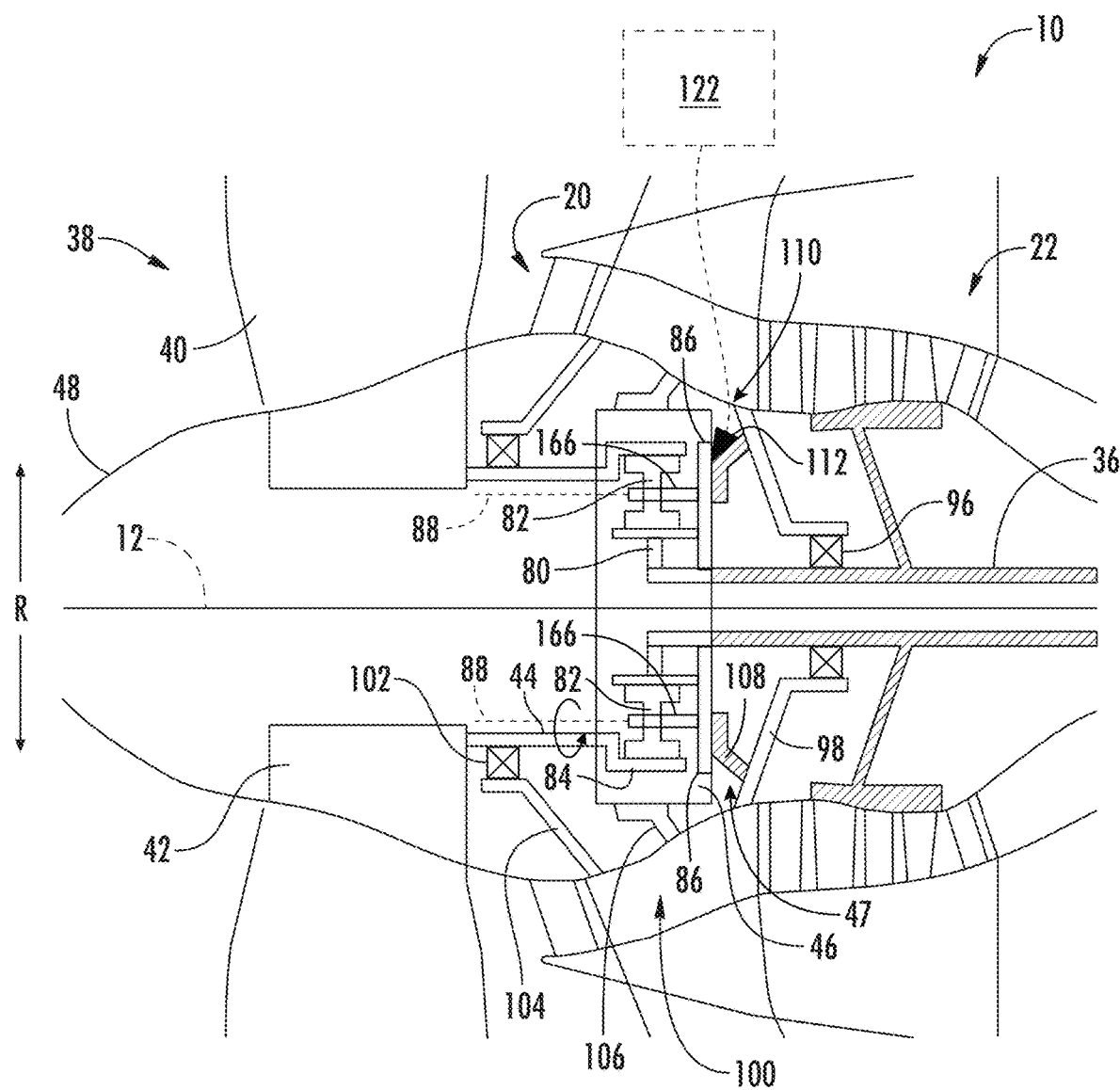
FIG. 2 is a detailed, schematic, cross-sectional view of a forward end of the exemplary gas turbine engine of FIG. 1 in accordance with an exemplary aspect of the present disclosure.

FIG. 2 is a detailed, schematic, cross-sectional view of a forward end of the exemplary gas turbine engine 10 of FIG. 1 in accordance with an exemplary aspect of the present disclosure. More specifically, FIG. 2 depicts a portion of the fan 38 of the fan section 14, the LPC 22 of the compressor section, and the power gearbox 46.

As stated above, the fan section 14 of the gas turbine engine 10 includes the fan 38 rotatable with the fan shaft 44. Additionally, the turbomachinery section 16 includes a turbomachine shaft rotatable with a turbine, or more particularly, the turbomachinery section 16 includes the LP shaft 36 rotatable with the LPT 30, as well as with the LPC 22. Moreover, the power gearbox 46 is mechanically coupled to both the fan shaft 44 and the LP shaft 36, such that the fan shaft 44 is rotatable by the LP shaft 36 across the power gearbox 46.

For the embodiment depicted, the power gearbox 46 is configured as an epicyclic power gearbox, or more specifically, as a planetary gearbox. For example, referring now also to FIG. 3, providing a schematic, cross-sectional view of the exemplary power gearbox 46 of FIG. 2, the exemplary power gearbox 46 generally includes a sun gear 80, a plurality of planet gears 82, and a ring gear 84. The sun gear 80 is fixedly attached to the LP shaft 36, such that the sun gear 80 rotates with the LP shaft 36. Additionally, the ring gear 84 is, for the embodiment depicted, fixedly connected to the fan shaft 44, such that the ring gear 84 rotates with the fan shaft 44. Each of the plurality of planet gears 82 are attached to a planet carrier 86. More particularly, each of the plurality of planet gears 82 are rotatably attached to the planet carrier 86, such that they may rotate relative to the planet carrier 86 about a respective planet gear axis 88. For the embodiment depicted, the planet carrier 86 remains stationary within the power gearbox 46.

During operation of the power gearbox 46, a plurality of teeth 90 of the sun gear 80 mesh with a plurality of teeth 92 of the planet gears 82, such that rotation of the sun gear 80 and LP shaft 36 in turn rotates each of the plurality of planet gears 82 about their respective planet gear axes 88. The plurality of teeth 92 of the planet gears 82 also mesh with a plurality of teeth 94 of the ring gear 84, such that rotation of the planet gears 82 about their respective planet gear axes 88 in turn rotate the ring gear 84 and fan shaft 44 about the longitudinal centerline 12.

Referring back particularly to FIG. 2, rotation of the LP shaft 36 is supported within the turbomachinery section 16 by one or more bearings. More specifically, for the embodiment depicted, the LP shaft 36 is supported within the turbomachinery section 16 by a thrust bearing 96. The thrust bearing 96 may be configured as a ball bearing, a tapered roller bearing, or any other suitable bearing configured to absorb forces from the LP shaft 36 along the axial direction A. Notably, the thrust bearing 96 is, in turn, supported by a first frame member 98 of the forward frame 100 of the gas turbine engine 10.

Similarly, the fan shaft 44 is also supported by one or more bearings. More specifically, the fan shaft 44 for the embodiment depicted is also supported by a thrust bearing 102, the thrust bearing 102, in turn, supported by a second frame member 104 of the forward frame 100 of the gas turbine engine 10. As is also depicted, the power gearbox 46 is also supported by the forward frame 100, and more specifically, is supported by a third frame member 106 and a fourth frame member 108 of the forward frame 100. It should be appreciated, however, that in other exemplary embodiments, the LP shaft 36 may additionally, or alternatively, be supported by any other suitable bearings at any other suitable location, and similarly, the fan shaft 44 may additionally, or alternatively, be supported by any other suitable bearings at any other suitable location. Moreover, in other exemplary embodiments, the thrust bearing 96 supporting the LP shaft 36 may be supported within the turbomachinery section 16 in any other suitable manner, and further, the thrust bearing 102 supporting the fan shaft 44 may also be supported in any other suitable manner.

During certain operations of the gas turbine engine 10, it may be beneficial to monitor an amount of torque applied within the gas turbine engine 10 to, e.g., help ensure that the gas turbine engine 10 is operating within a desired operational range. More specifically, it may be beneficial to monitor an amount of torque applied across the power gearbox 46 of the gas turbine engine 10. Additionally, sensing the torque applied across the power gearbox 46 relative to a static, non-rotating portion of the power gearbox 46 may allow a size of the power gearbox 46 to be reduced. Reducing the size of the power gearbox 46 may also reduce a weight of the power gearbox 46 and may reduce heat loads experienced by the power gearbox 46. Accordingly, the gas turbine engine 10 depicted includes a torque monitoring system 110 for measuring an amount of torque applied across the power gearbox 46 from a shaft of the gas turbine engine 10.

For the embodiment depicted, the torque monitoring system 110 includes a gearbox sensor 112 operable with the power gearbox 46 and at least one grounded or stationary structure of the gas turbine engine 10. The torque monitoring system 110 is configured to determine a torque across the power gearbox 46 using the gearbox sensor 112, as will be described with respect to FIG. 4, below.

As is also depicted in FIG. 2, the gearbox sensor 112 is operably connected to a controller or control device, such as a controller 122, of the torque monitoring system 110. The controller 122 of the torque monitoring system 110 may include one or more controllers of a gas turbine engine (not shown) within which the torque monitoring system 110 is installed, or of an aircraft with which an engine containing the torque monitoring system 110 is provided. The gearbox sensor 112 may be operably connected to the controller 122 using any suitable wired or wireless communication network.

It should be appreciated, however, that the exemplary turbofan engine and torque monitoring system 110 described above with reference to FIGS. 2-3 are provided by way of example only. In other exemplary embodiments, the turbofan engine and torque monitoring system 110 may be configured in any other suitable manner. For example, the torque monitoring system 110 may be configured with any other suitable gas turbine engine. Moreover, the power gearbox 46 may instead be an epicyclic power gearbox in a star configuration or a compound epicyclic power gearbox. Additionally, in other exemplary embodiments, the gearbox sensor 112 may include a plurality of the gearbox sensors 112 spaced, e.g., in a circumferential manner.

Figure 3:
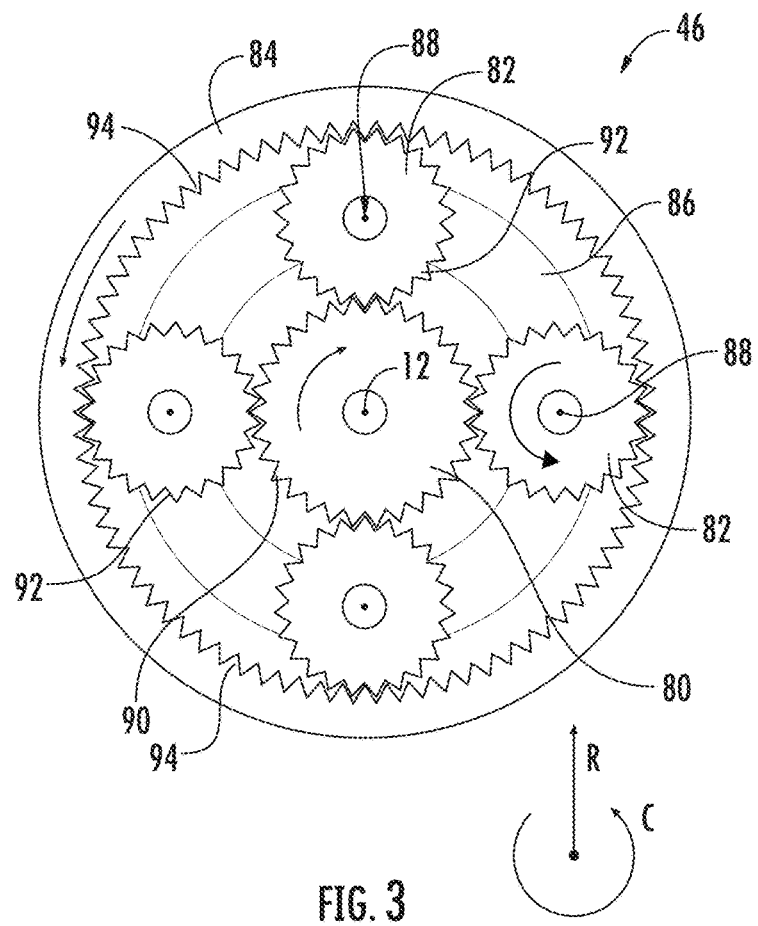
FIG. 3 is a cross-section view of a power gearbox of the exemplary gas turbine engine of FIG. 1 in accordance with an exemplary aspect of the present disclosure.
Figure 4:
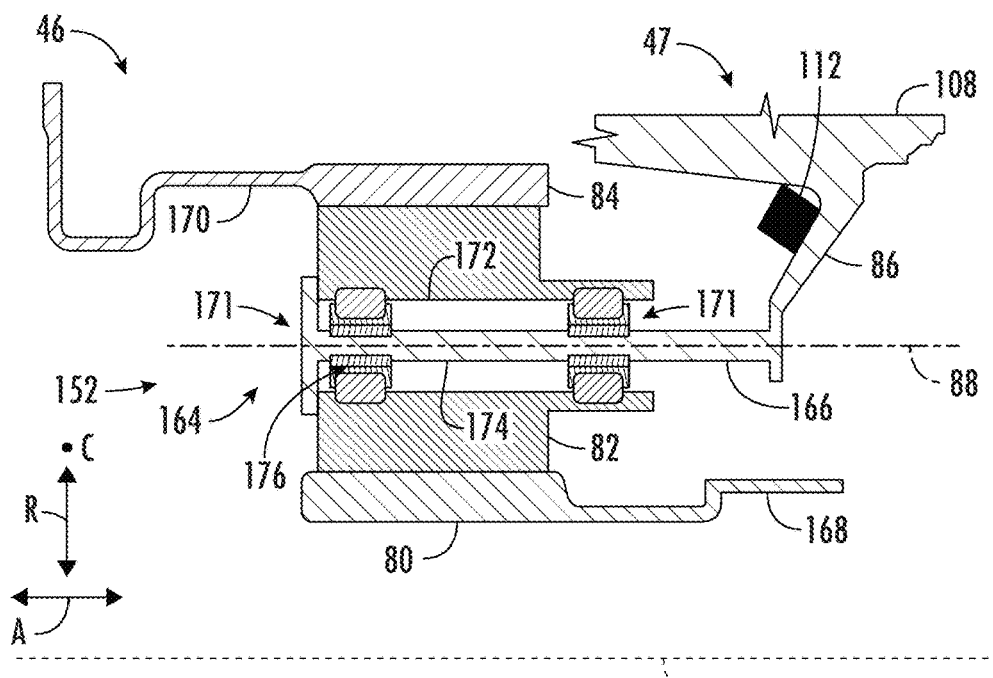
FIG. 4 is a schematic, cross-section view of the exemplary power gearbox of FIG. 3 in accordance with an exemplary aspect of the present disclosure.

FIG. 4 is a schematic, cross-section view of the exemplary power gearbox 46 of FIG. 3 in accordance with an exemplary aspect of the present disclosure. The exemplary power gearbox 46 may be incorporated into the exemplary gas turbine engine 10 discussed above with reference to FIGS. 1-2, or alternatively, may be incorporated into any other suitable gas turbine engine (e.g., an open rotor engine, a ducted rotor engine, a turbofan engine, a turboshaft engine, a turboprop engine, a turbojet engine, etc.), any other suitable combustion engine utilizing a gearbox, etc.

In at least one example embodiment, the power gearbox 46 may generally include a first attachment structure 168 coupled to the sun gear 80 and configured to be coupled to a first rotating component of the gas turbine engine 10. The first rotating component may be the LP shaft 36. Thus, the first attachment structure 168 may be coupled between the sun gear 80 and at least one of the HPT 28 and the LPT 30 of the gas turbine engine 10. However, in other embodiments, the sun gear 80 may be directly coupled to a rotating shaft of the gas turbine engine 10, such as the LP shaft 36 or the HP shaft 34. Further, the power gearbox 46 may generally include a second attachment structure 170 coupled to the ring gear 84 and configured to be coupled to a second rotating component of the gas turbine engine 10. In at least one example embodiment, the second rotating component may be the fan 38. For example, the second attachment structure 170 may be coupled between the ring gear 84 and the fan shaft 44 of the gas turbine engine 10. In other embodiments, the ring gear 84 may be directly coupled to the fan 38. Alternatively, when incorporated into other engines or other gearboxes, one or both of the ring gear 84 and the sun gear 80 may instead be configured to be coupled to any other rotating shafts or components of the engine.

In at least one example embodiment, a static member of the power gearbox 46 may be coupled to a grounded structure of the gas turbine engine 10. As shown in FIG. 4, for example, the planet carrier 86 of the power gearbox 46 may be coupled to the forward frame 100 of the gas turbine engine 10. As shown, the planet carrier 86 may be coupled to or support the plurality of planet gears 82 via shafts 166 of the planet carrier 86 (only one of each of the planet gears 82 and shafts 166 is illustrated in the embodiment of FIG. 4). Additionally, the planet carrier 86 may be coupled to the fourth frame member 108 of the gas turbine engine 10. Thus, the planet carrier 86 may be coupled directly or indirectly to the forward frame 100 of the gas turbine engine 10 such that the planet carrier 86 supports the power gearbox 46 relative to the gas turbine engine 10. Additionally, or alternatively, the planet carrier 86 may be coupled to the second attachment structure 170 or directly with the fan 38 such that the planet carrier 86 rotates about the longitudinal centerline 12 with the fan 38, while the sun gear 80 is coupled to the frame of the engine (a planetary gearbox configuration).

In other example embodiments, the planet carrier 86 may be coupled directly to the outer casing 18 of the gas turbine engine 10, a gearbox assembly casing, or another suitable mounting structure of the gas turbine engine 10.

As shown in FIG. 4, the power gearbox 46 may also include one or more bearing assemblies 171, each corresponding to the shaft 166 and the planet gear 82 of each shaft 166 and planet gear 82 pair. Each bearing assembly 171 is generally configured to allow relative rotation of the corresponding planet gear 82 about the shaft 166, e.g., about the planet gear axis 88. For example, the bearing assembly 171 may be arranged between a central ring 172 defining a central bore 164 of a corresponding planet gear 82 and an exterior surface 174 of the corresponding shaft 166. In the embodiment shown, the bearing assembly(ies) 171 may include a thrust bearing including a plurality of ball bearings or a roller bearing including a plurality of roller element bearings. An exemplary bearing assembly 171 may include an inner race (not shown) coupled either directly or indirectly to the exterior surface 174 of the corresponding shaft 166. Further, the exemplary bearing assembly 171 may include an outer race (not shown) coupled either directly or indirectly to the central ring 172 of the corresponding planet gear 82. The plurality of ball bearings or roller bearings (not shown) may be arranged between the inner and outer races circumferentially about the planet gear axis 88 to allow relative rotation of the inner and outer races (and thus the shaft 166 and planet gear 82) about the planet gear axis 88. It should be appreciated, however, that in other example embodiments, the bearing assembly(ies) 171 may instead have any other suitable form or configuration.

In at least one example embodiment, the torque monitoring system 110 is configured to measure a torque across the power gearbox 46 using the gearbox sensor 112. The gearbox sensor 112 may be coupled between the power gearbox 46 and a grounded structure, such as the forward frame 100, of the gas turbine engine 10. More specifically, as shown in FIG. 4, the gearbox sensor 112 may be coupled to the planet carrier 86 and the fourth frame member 108 of the forward frame 100. The planet carrier 86 and the fourth frame member 108 may be stationary. The gearbox sensor 112 is operable to sense data indicative of torque across a torque reaction pathway defined by the fan shaft 44, the power gearbox 46, and the grounded structure or forward frame 100. More specifically, the gearbox sensor 112 may be configured to sense data indicative of a deflection of the planet carrier 86 relative to fourth frame member 108 to determine the torque across the power gearbox 46. For example, the fan shaft 44 may exert a torque on the power gearbox 46. The torque exerted on the power gearbox 46 may cause the planet carrier 86 to deflect relative to the fourth frame member 108. The amount of deflection of the planet carrier 86 relative to the fourth frame member 108 may be sensed by the gearbox sensor 112 to determine the torque across the power gearbox 46. In at least one example embodiment, the gearbox sensor 112 may include a load cell, a strain gauge, a torsion tube, or a combination thereof.

Figure 5:
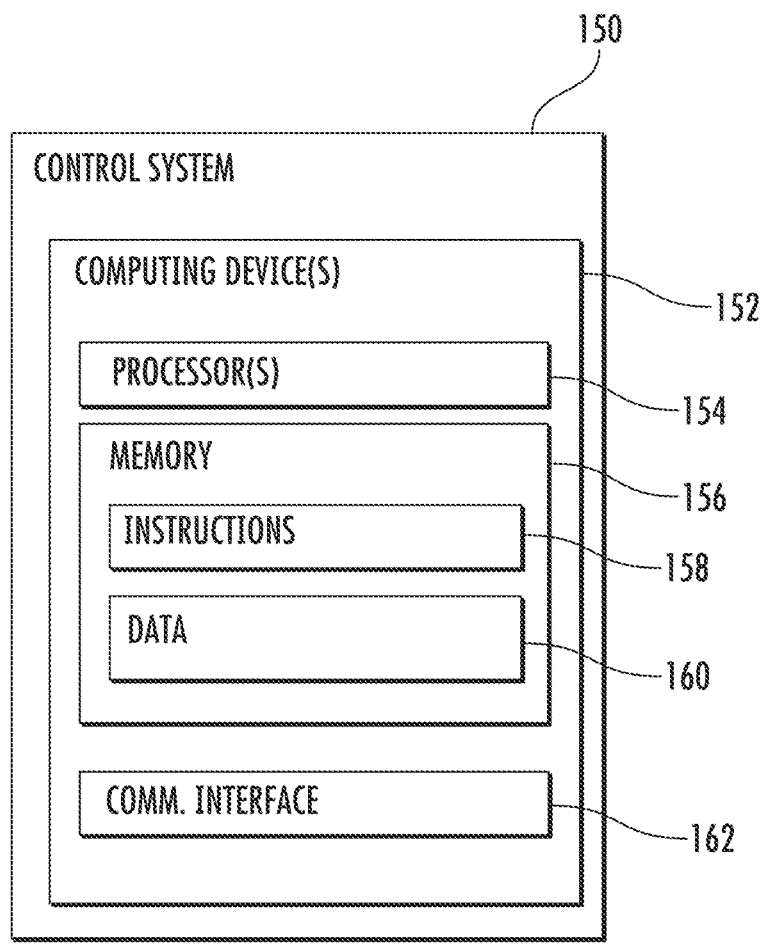
FIG. 5 is a schematic view of a control system in accordance with an exemplary aspect of the present disclosure.

FIG. 5 is a schematic view of a control system 150 in accordance with an exemplary aspect of the present disclosure.

In at least one example embodiment, the controller 122 of the torque monitoring system 110 discussed above may be configured as part of a control system 150. The control system 150 can include one or more computing device(s) 152. Notably, the controller 122 depicted in FIG. 2 may be one of the one or more computing device(s) 152 of the exemplary control system 150 depicted in FIG. 5. The computing device(s) 152 may be configured to execute one or more methods in accordance with exemplary aspects of the present disclosure (such as methods 600, 700, 800, 900, and 1000 described below with reference to FIGS. 6A-10). The computing device(s) 152 can include one or more processor(s) 154 and one or more memory device(s) 156. The one or more processor(s) 154 can include any suitable processing device, such as a microprocessor, microcontroller, integrated circuit, logic device, or other suitable processing device. The one or more memory device(s) 156 can include one or more computer-readable media, including, but not limited to, non-transitory computer-readable media, RAM, ROM, hard drives, flash drives, or other memory devices.

The one or more memory device(s) 156 can store information accessible by the one or more processor(s) 154, including computer-readable instructions 158 that can be executed by the one or more processor(s) 154. The instructions 158 can be any set of instructions that when executed by the one or more processor(s) 154, cause the one or more processor(s) 154 to perform operations. The instructions 158 can be software written in any suitable programming language or can be implemented in hardware. In some embodiments, the instructions 158 can be executed by the one or more processor(s) 154 to cause the one or more processor(s) 154 to perform operations, such as the operations for regulating fuel flow, as described herein, and/or any other operations or functions of the one or more computing device(s) 152. Additionally, and/or alternatively, the instructions 158 can be executed in logically and/or virtually separate threads on processor 154. The memory device(s) 156 can further store data 160 that can be accessed by the processors 154. The data 160 may include date indicative of the torque across the power gearbox 46, which will be described in greater detail below.

The computing device(s) 152 can also include a communications interface 162 used to communicate, for example, with the components of gas turbine engine 10, torque monitoring system 110, and/or other computing device(s) 152. The communications interface 162 can include any suitable components for interfacing with these components or one or more communications network(s), including for example, transmitters, receivers, ports, controllers, antennas, wired communication buses, or other suitable components. Control system 150 may also be in communication (e.g., via communications interface 162) with various sensors, such as the gearbox sensor 112 described above, and may selectively operate gas turbine engine 10 in response to user input and feedback from these sensors. Moreover, the control system may be configured to determine the torque across the power gearbox 46 via data received from the gearbox sensor 112, such as the data sensed by the gearbox sensor 112 indicative of a deflection of the planet carrier 86 relative to the fourth frame member 108.

The technology discussed herein makes reference to computer-based systems and actions taken by and information sent to and from computer-based systems. It should be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 6A:
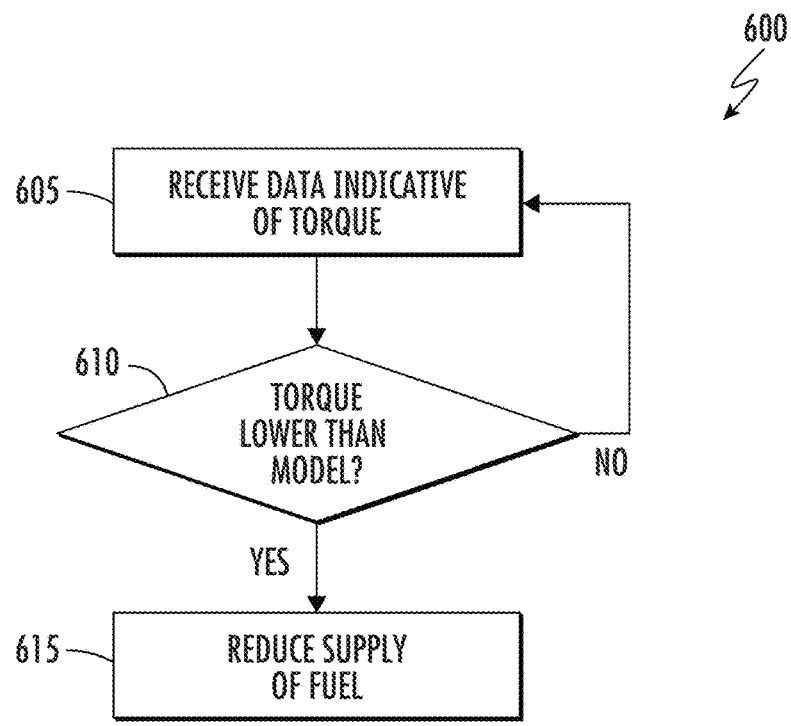
FIG. 6A is a flow diagram of a method for monitoring and reducing torque within a gas turbine engine in accordance with an exemplary aspect of the present disclosure.
Figure 6B:
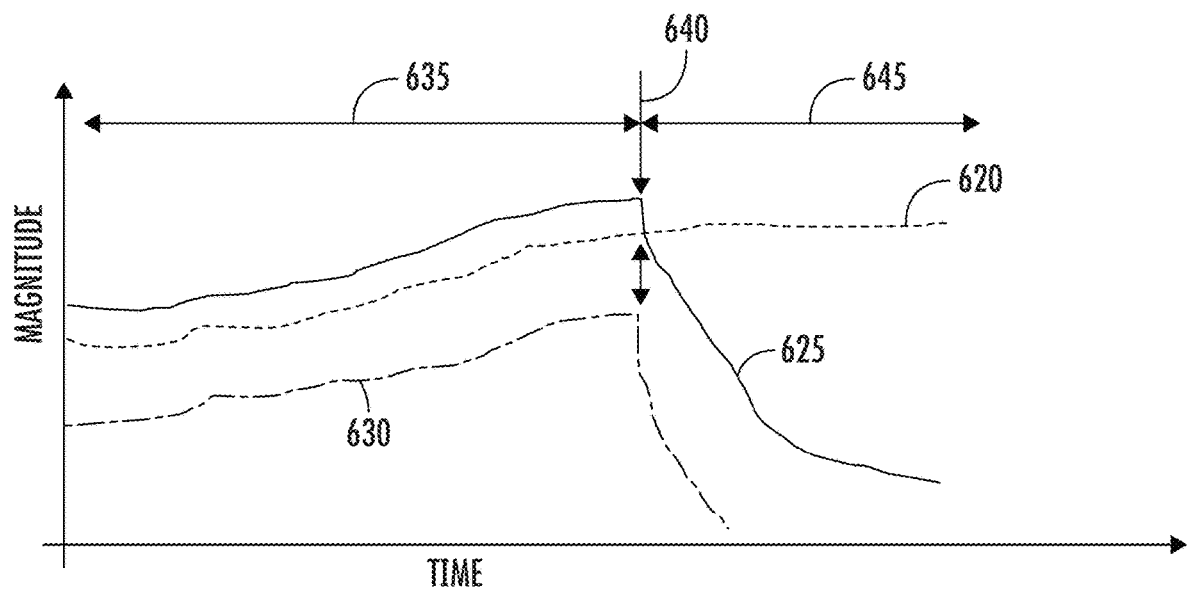
FIG. 6B is a graphical representation of the method for monitoring and reducing torque of FIG. 6A in accordance with an exemplary aspect of the present disclosure.

FIG. 6A is a flow diagram of a method 600 for monitoring and reducing torque within the gas turbine engine 10 in accordance with an exemplary aspect of the present disclosure. FIG. 6B is a graphical representation of the method 600 for monitoring and reducing torque of FIG. 6A in accordance with an exemplary aspect of the present disclosure.

In at least one example embodiment, the method 600 includes receiving data indicative of the torque across the power gearbox 46 at 605, determining the torque across the power gearbox 46 is less than a model torque for the power gearbox 46 using the received data indicative of the torque across the power gearbox 46 at 610, and reducing a supply of fuel to the gas turbine engine 10 in response to determining the torque across the power gearbox 46 is less than the model torque for the power gearbox 46 at 615.

In at least one example embodiment, the controller 122 is configured to receive the data indicative of the torque across the power gearbox 46 from the gearbox sensor 112 at 605. For example, the controller 122 may receive the data indicative of the torque across the power gearbox 46 from the gearbox sensor 112. Additionally, or alternatively, the controller 122 may receive the data indicative of the torque across the power gearbox 46 from another sensor associated with the power gearbox 46 or the gas turbine engine.

Additionally, the control system 150 may determine the torque across the power gearbox 46 and determine whether the torque across the power gearbox 46 is less than the model torque for the power gearbox 46 at 610. The model torque may be determined based on a function of a speed of the fan shaft 44, a pitch of the fan blades 40 of the fan 38, a Mach number, an ambient temperature, an altitude, or a combination thereof.

With reference to FIG. 6B, the model torque may be represented by a model torque line 620. The data indicative of the torque across the power gearbox 46 received by the controller 122 is represented by the torque line 625. Additionally, the supply of fuel to the gas turbine engine 10 is represented by the fuel supply line 630. If it is determined that the torque across the power gearbox 46 is greater than or equal to the model torque for the power gearbox 46 at 610, the gas turbine engine 10 is in a normal operation mode. In the normal operation mode, the torque line 625 is above, or greater than or equal to, the model torque line 620, as shown during a normal operation period 635 shown in FIG. 6B. If the gas turbine engine 10 is in the normal operation mode, such that the torque across the power gearbox 46 is greater than or equal to the model torque for the power gearbox 46 at 610, the method 600 then proceeds to step 605 where the data indicative of the torque across the power gearbox 46 is continuously monitored, such as by the gearbox sensor 112, and received by the controller 122 for monitoring by the control system 150.

If it is determined that the torque across the power gearbox 46 is less than the model torque for the power gearbox 46 at 610, the supply of fuel to the gas turbine engine 10 is reduced at 615. As shown in FIG. 6B, for example, the torque across the power gearbox 46, indicated by the torque line 625, falls below the model torque line at 620 at a failure point 640. In at least one example embodiment, the torque line 625 may fall below the model torque line 620 in the event of a shaft failure, such as the LP shaft 36, the fan shaft 44, or a combination thereof.

Additionally, when the torque line 625 falls below the model torque line 620, the gas turbine engine 10 may be in a shutdown mode, as shown during a shutdown period 645 shown in FIG. 6B. If the gas turbine engine 10 is in the shutdown mode, such that the torque across the power gearbox 46 is less than the model torque for the power gearbox 46 at 610, the method 600 then proceeds to step 615 where the supply of fuel to the gas turbine engine 10 is reduced. For example, as shown in FIG. 6B, the fuel supply line 630 decreases during the shutdown period 645 compared to the normal operation period 635.

Figure 7A:
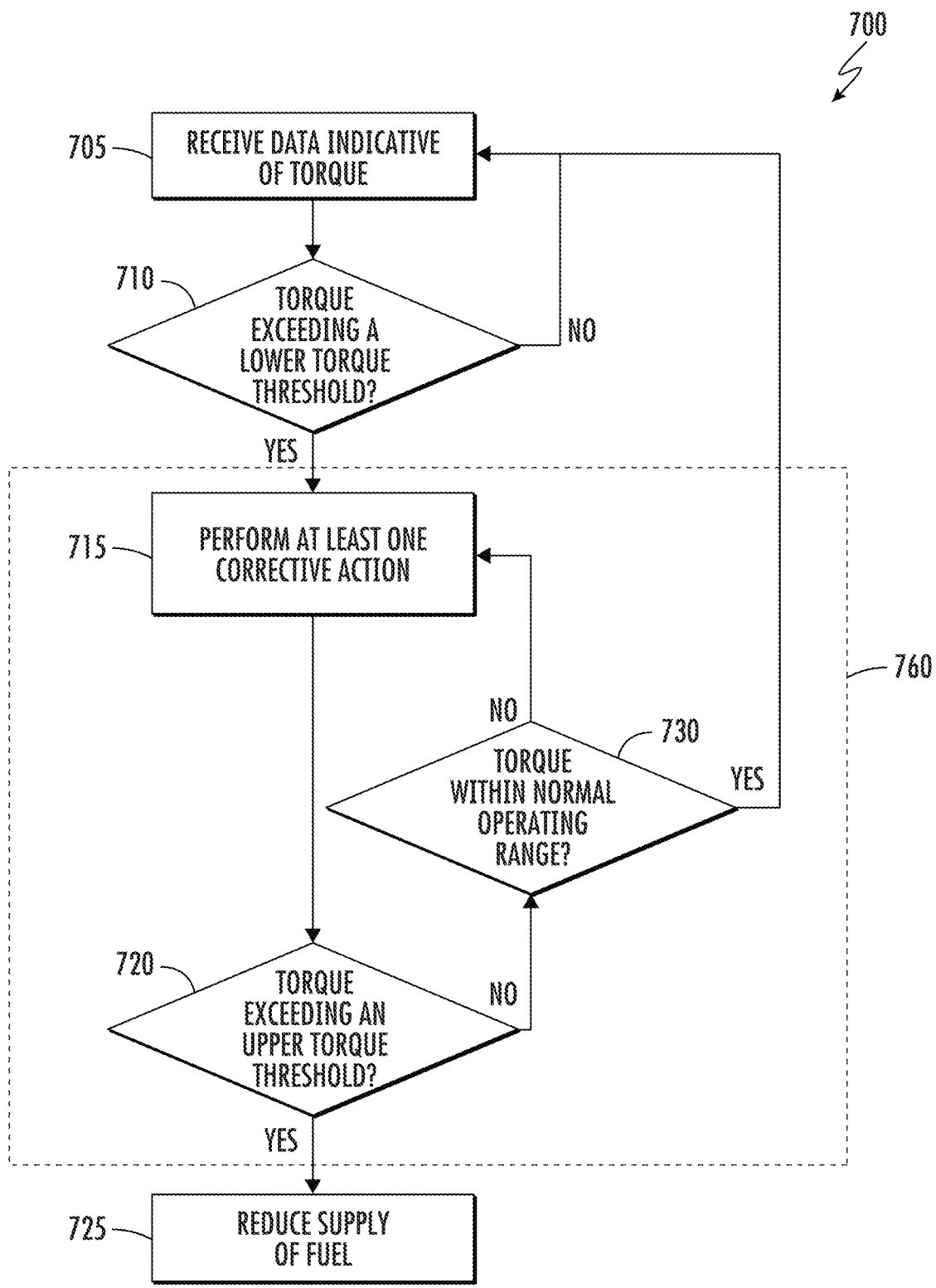
FIG. 7A is a flow diagram of a method for monitoring and reducing torque within a gas turbine engine in accordance with an exemplary aspect of the present disclosure.
Figure 7B:
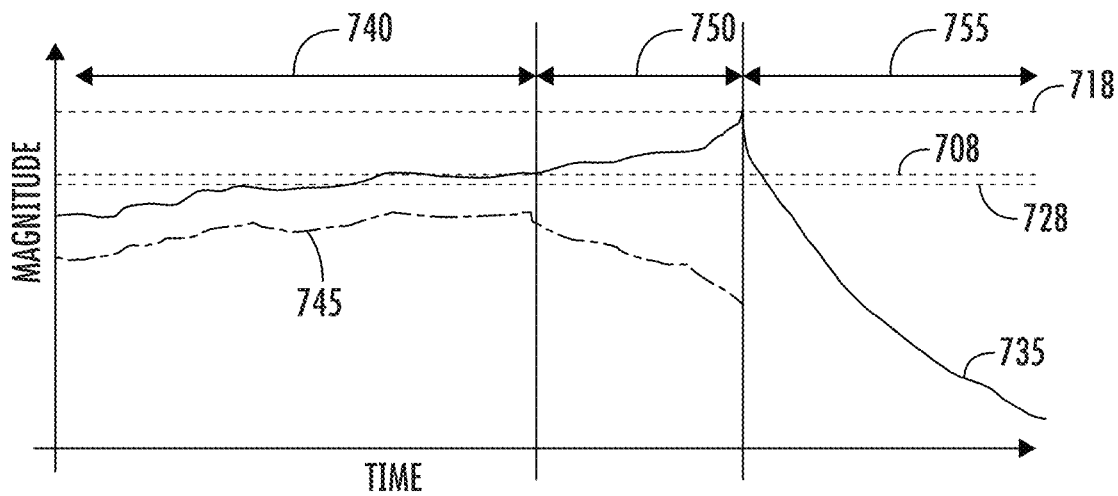
FIG. 7B is a graphical representation of the method for monitoring and reducing torque of FIG. 7A in accordance with an exemplary aspect of the present disclosure.
Figure 7C:
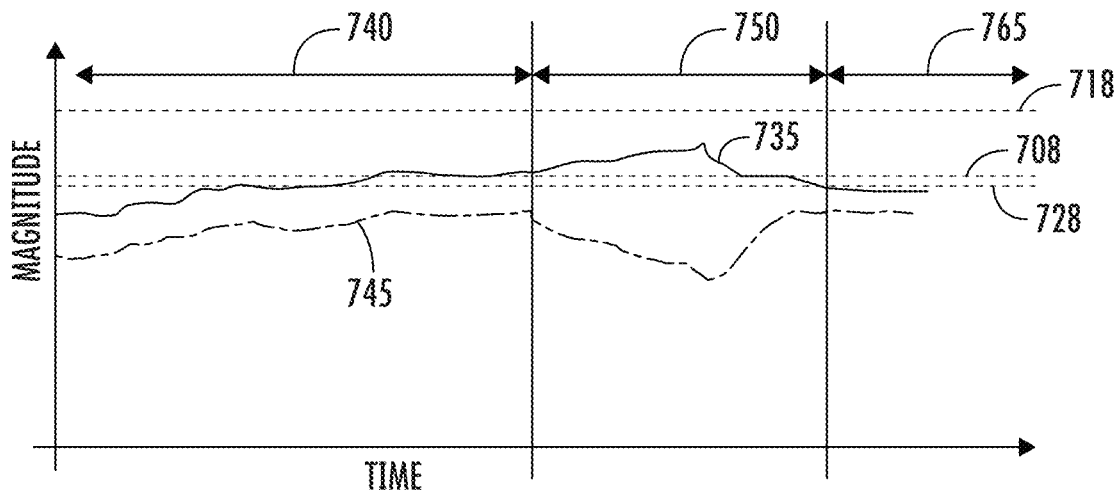
FIG. 7C is another graphical representation of the method for monitoring and reducing torque of FIG. 7A in accordance with an exemplary aspect of the present disclosure.

FIG. 7A is a flow diagram of a method 700 for monitoring and reducing torque within the gas turbine engine 10 in accordance with an exemplary aspect of the present disclosure. FIG. 7B is a graphical representation of the method 700 for monitoring and reducing torque of FIG. 7A in accordance with an exemplary aspect of the present disclosure. FIG. 7C is another graphical representation of the method 700 for monitoring and reducing torque of FIG. 7A in accordance with an exemplary aspect of the present disclosure. More particularly, FIG. 7B illustrates a shutdown case and FIG. 7C illustrates a recovery case of the gas turbine engine 10 in response the torque across the power gearbox 46 exceeding one or more torque thresholds.

In at least one example embodiment, the fan 38 of the gas turbine engine 10 may be a fixed pitch fan. Accordingly, the fan blades 40 of the fan 38 remain stationary. In such embodiments, the method 700 includes receiving data indicative of the torque across the power gearbox 46 at 705, determining the torque across the power gearbox 46 exceeds a lower torque threshold 708 (shown in FIGS. 7B-7C) using the received data indicative of the torque across the power gearbox 46 at 710, performing at least one corrective action in response to determining the torque across the power gearbox 46 exceeds the lower torque threshold 708 at 715, determining the torque across the power gearbox exceeds an upper torque threshold 718 (shown in FIGS. 7B-7C) using the received data indicative of the torque across the power gearbox 46 at 720, reducing the supply of fuel to the gas turbine engine 10 in response to determining the torque across the power gearbox 46 exceeds the upper torque threshold 718 at 725, and determining the torque across the power gearbox 46 is within a normal operating range 728 (shown in FIGS. 7B-7C) at 730.

In at least one example embodiment, the controller 122 is configured to receive the data indicative of the torque across the power gearbox 46. For example, the controller 122 may receive the data indicative of the torque across the power gearbox 46 from the gearbox sensor 112. Additionally, or alternatively, the controller 122 may receive the data indicative of the torque across the power gearbox 46 from another sensor associated with the power gearbox 46 or the gas turbine engine 10.

The control system 150 may determine the torque across the power gearbox 46 based on the data received and determine whether the torque across the power gearbox 46 exceeds the lower torque threshold 708 at 710. If the torque across the power gearbox 46 does not exceed the lower torque threshold 708 at 710, the gas turbine engine 10 is operating in a normal operation mode. With reference to FIGS. 7B-7C, in the normal operation mode, the torque across the power gearbox 46 (represented by a torque line 735) is less than or equal to the lower torque threshold 708, as shown during a normal operation period 740. Moreover, if the torque across the power gearbox 46 does not exceed the lower torque threshold 708 at 710, the method 700 proceeds to step 705 where the data indicative of the torque across the power gearbox 46 is continuously monitored, such as by the gearbox sensor 112, and received by the controller 122 for monitoring by the control system 150.

If the torque across the power gearbox 46 exceeds the lower torque threshold 708 at 710, at least one corrective action is performed at 715. Performing at least one corrective action at 715 includes reducing a rotational speed of the fan shaft 44, reducing a flow rate of fuel to the gas turbine engine 10, or both. With reference to FIGS. 7B-7C, performing the at least one corrective action at 715 may cause the gas turbine engine to run at reduced thrust, as indicated during a reduced thrust period 750. During the reduced thrust period 750, the supply of fuel to the gas turbine engine 10 may be reduced compared to the supply of fuel to the gas turbine engine 10 during the normal operation period 740, in which the supply of fuel to the gas turbine engine may remain substantially constant or may be increased.

If the torque across the power gearbox 46 exceeds the upper torque threshold 718 at 720, the supply of fuel to the gas turbine engine 10 may be reduced at 725. The supply of fuel to the gas turbine engine 10 may be reduced during the reduced thrust period 750. As shown in FIG. 7B, if the torque across the power gearbox 46, as indicated by the torque line 735, continues to increase during the reduced thrust period 750 such that the torque across the power gearbox 46 is greater than the upper torque threshold 718, the supply of fuel to the gas turbine engine 10 may be shut off. For example, the supply of fuel to the gas turbine engine 10 may be shut off during a shutdown period 755 to allow the torque across the power gearbox 46 to decrease. Accordingly, as shown in FIG. 7B, the fuel supply line 745 goes to about zero (0) and the torque line 735 decreases during the shutdown period 755.

If the torque across the power gearbox 46 does not exceed the upper torque threshold 718 at 720, the method 700 proceeds to determine whether the torque across the power gearbox 46 is within the normal operating range 728 at 730.

The normal operating range 728 may be less than the lower torque threshold 708. Moreover, the lower torque threshold 708 may be greater than the normal operating range 728 and the upper torque threshold 718 may be greater than the lower torque threshold 708.

If the torque across the power gearbox 46 is not within the normal operating range 728 at 730, the method 700 returns to step 715 where the at least one corrective action is performed. After the at least one corrective action is performed at 720, the method returns to step 720 to determine if the torque across the power gearbox 46 exceeds the upper torque threshold 718. If the torque still does not exceed the upper torque threshold 718 at 720, the method returns to step 730 to determine if the torque across the power gearbox 46 is within the normal operating range 728 at 730. Accordingly, the method 700 includes an iterative loop 760 configured to reduce the torque across the power gearbox 46 until the torque across the power gearbox 46 is within the normal operating range 728. For example, the iterative loop 760 includes performing the at least one corrective action at 715 while the torque across the power gearbox 46 remains less than the upper torque threshold 718 during the reduced thrust period 750 until the torque across the power gearbox 46 is within the normal operating range 728. As shown in FIG. 7C, the torque across the power gearbox 46 returned to be within the normal operating range 728 during a second normal operation period 765. Accordingly, in the example embodiment shown in FIG. 7C, the torque across the power gearbox 46 recovered, or returned to be within the normal operating range 728, after exceeding the lower torque threshold 708 and performing the at least one corrective action during the reduced thrust period 750.

With reference to FIG. 7C, the fuel supplied to the gas turbine engine 10 is reduced during at least a portion of the reduced thrust period 750, as indicated by the fuel supply line 745. Reducing the supply of fuel to the gas turbine engine 10 may reduce the torque across the power gearbox 46, as indicated by the torque line 735. Once the torque across the power gearbox 46 is less than or equal to the lower torque threshold 708, the supply of fuel to the gas turbine engine 10 may be increased, as shown in FIG. 7C. Moreover, if the torque across the power gearbox 46 is within the normal operating range 728 at 730, the gas turbine engine is in the normal operation mode, as shown during the second normal operation period 765. Accordingly, the method 700 proceeds from determining the torque across the power gearbox 46 is within the normal operating range 728 at 730 to step 705 where the data indicative of the torque across the power gearbox 46 is continuously monitored, such as by the gearbox sensor 112, and received by the controller 122 for monitoring by the control system 150.

Figure 8A:
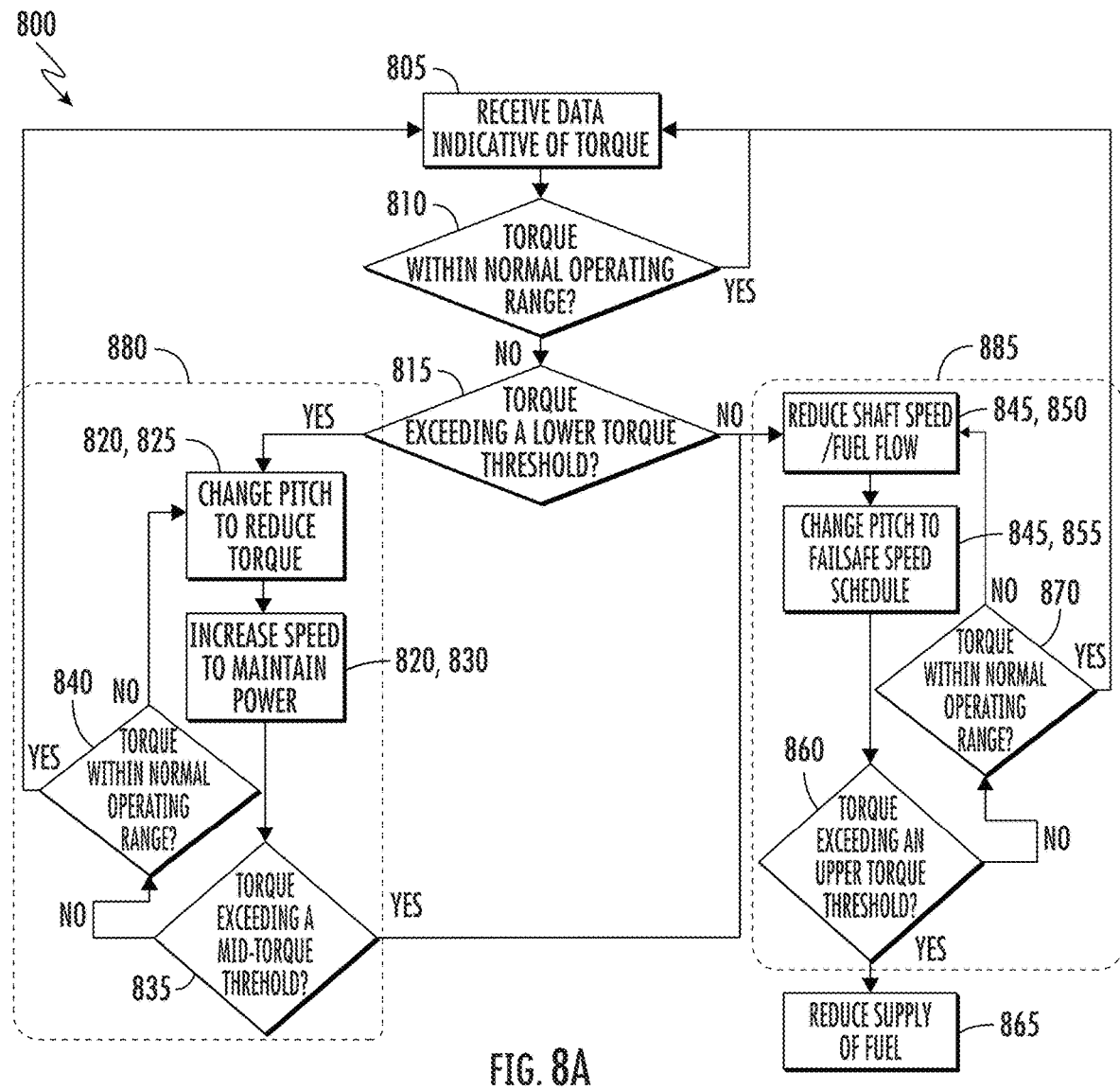
FIG. 8A is a flow diagram of a method for monitoring and reducing torque within a gas turbine engine in accordance with an exemplary aspect of the present disclosure.
Figure 8B:
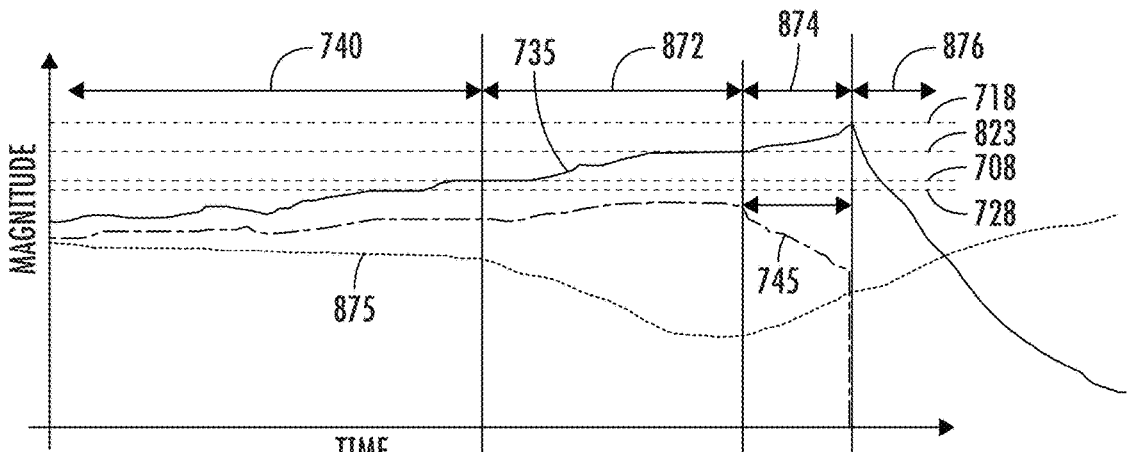
FIG. 8B is a graphical representation of the method for monitoring and reducing torque of FIG. 8A in accordance with an exemplary aspect of the present disclosure.
Figure 8C:
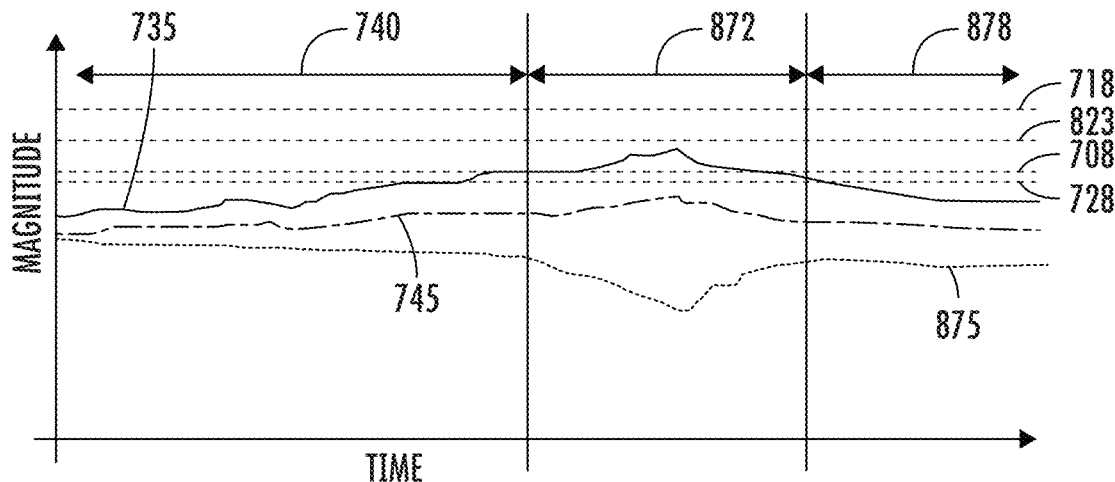
FIG. 8C is another graphical representation of the method for monitoring and reducing torque of FIG. 8A in accordance with an exemplary aspect of the present disclosure.

FIG. 8A is a flow diagram of a method 800 for monitoring and reducing torque within the gas turbine engine 10 in accordance with an exemplary aspect of the present disclosure. FIG. 8B is a graphical representation of the method 800 for monitoring and reducing torque of FIG. 8A in accordance with an exemplary aspect of the present disclosure. FIG. 8C is another graphical representation of the method 800 for monitoring and reducing torque of FIG. 8A in accordance with an exemplary aspect of the present disclosure. More particularly, FIG. 8B illustrates a shutdown case and FIG. 8C illustrates a recovery case of the gas turbine engine 10 in response the torque across the power gearbox 46 exceeding one or more torque thresholds.

In at least one example embodiment, the fan 38 of the gas turbine engine 10 may be a variable pitch fan. Accordingly, a pitch of one or more of the fan blades 40 of the fan 38 may be adjusted. In such embodiments, the method 800 includes receiving data indicative of the torque across the power gearbox 46 at 805, determining the torque across the power gearbox 46 exceeds the normal operating range 728 using the received data indicative of the torque across the power gearbox 46 at 810, and determining the torque across the power gearbox 46 exceeds the lower torque threshold 708 using the received data indicative of the torque across the power gearbox 46 at 815. Based on the torque across the power gearbox 46 exceeding the lower torque threshold 708 at 815, the method 800 includes performing a first corrective action at 820, determining the torque across the power gearbox 46 is less than or equal to a mid-torque threshold 823 (shown in FIGS. 8B-8C) at 835, and determining the torque across the power gearbox 46 is within the normal operating range 728 at 840. Based on the torque across the power gearbox 46 not exceeding, or being less than or equal to, the lower torque threshold 708 at 815, the method 800 includes performing a second corrective action at 845, determining the torque across the power gearbox 46 is less than or equal to the upper torque threshold 718 at 860, reducing the supply of fuel to the gas turbine engine 10 at 865, and determining the torque across the power gearbox 46 is within the normal operating range 728 at 870.

In at least one example embodiment, the controller 122 is configured to receive the data indicative of the torque across the power gearbox 46 at 805. For example, the controller 122 is configured to receive the data indicative of the torque across the power gearbox 46 from the gearbox sensor 112. Additionally, or alternatively, the controller 122 may be configured to receive the data indicative of the torque across the power gearbox 46 from another sensor associated with the power gearbox 46 or the gas turbine engine 10. Moreover, the control system 150 may determine the torque across the power gearbox 46 based on the data received and determine whether the torque across the power gearbox 46 exceeds the normal operating range 728 at 810.

If the torque across the power gearbox 46 does not exceed the normal operating range 728 at 810, the gas turbine engine 10 is operating in a normal operation mode. With reference to FIGS. 8B-8C, in the normal operation mode, the torque across the power gearbox 46 (represented by the torque line 735) is less than or equal to the normal operating range 728, as shown during the normal operation period 740. The torque across the power gearbox 46 may also be less than or equal to the lower torque threshold 708 during the normal operation period 740. Moreover, if the torque across the power gearbox 46 does not exceed the normal operating range 728 at 810, the method 800 returns to step 805 where the data indicative of the torque across the power gearbox 46 is continuously monitored, such as by the gearbox sensor 112, and received by the controller 122 for monitoring by the control system 150.

If the torque across the power gearbox 46 exceeds the normal operating range 728 at 810, the method 800 proceeds to determining whether the torque across the power gearbox 46 exceeds the lower torque threshold 708 at 815. If the torque across the power gearbox 46 exceeds the lower torque threshold 708 at 815, a first corrective action is performed at 820. The first corrective action performed at 820 may include a plurality of corrective actions. For example, the first corrective action performed at 820 may include adjusting the pitch of one or more of the fan blades 40 of the fan 38 at 825, increasing a rotational speed of the fan 38 at 830, or both.

With reference to FIGS. 8A-8B, the first corrective action performed at 820 may be performed during a first accommodation period 872. The first corrective action performed at 820 during the first accommodation period 872 may include actions that require a longer time constant. For example, it may take longer to reduce the torque across the power gearbox 46 in response to changing the pitch of one or more of the fan blades 40 of the fan 38 compared to reducing the supply of fuel to the gas turbine engine 10. It may be beneficial to perform actions that require a longer time constant first in order to maintain engine power and thrust before performing actions that require adjusting the fuel supply and shutting down the gas turbine engine 10.

After performing the first corrective action at 820, the method 800 proceeds to determining if the torque across the power gearbox 46 exceeds the mid-torque threshold 823 at 835. As shown in FIGS. 8B-8C, the mid-torque threshold 823 is greater than the lower torque threshold 708 and less than the upper torque threshold 718. The mid-torque threshold 823 is a threshold at which the control system 150 may begin taking additional actions, such as in addition to the first corrective action performed at 820, to reduce the torque across the power gearbox 46. For example, the control system 150 may begin taking actions that reduce thrust in order to reduce the torque across the power gearbox 46 if the mid-torque threshold 823 is exceeded, as will be discussed in greater detail below.

If the torque across the power gearbox 46 does not exceed the mid-torque threshold 823 at 835, the method 800 proceeds to determining whether the torque across the power gearbox 46 is within the normal operating range 728 at 840. If the torque across the power gearbox 46 is within the normal operating range 728, the method 800 returns to step 805. If the torque across the power gearbox 46 is outside the normal operating range 728, such as greater than the normal operating range 728, the method 800 returns to performing the first corrective action at 820. Accordingly, the method 800 includes a first iterative loop 880 for reducing the torque across the power gearbox 46 below the mid-torque threshold 823 and the lower torque threshold 708.

With reference to FIG. 8C, the torque across the power gearbox 46 does not exceed the mid-torque threshold 823, as indicated by the torque line 735. During the first accommodation period 872, the first corrective action performed at 820 may have been performed at least once, such as via the first iterative loop 880, to reduce the torque across the power gearbox 46 below the mid-torque threshold 823. For example, the pitch of one or more of the fan blades 40 of the fan 38 may have adjusted during the first accommodation period 872, as indicated by a pitch line 875. Still referring to FIG. 8C, the torque across the power gearbox 46 was also reduced during the first accommodation period 872 in response to the change of pitch. Additionally, because performing the first corrective action at 820 during the first accommodation period 872 reduced the torque across the power gearbox 46, the supply of fuel to the gas turbine engine 10 was maintained, as indicated by the fuel supply line 745, and thus the power and thrust of the gas turbine engine 10 need not be affected.

As shown in FIG. 8C, after the first accommodation period 872, the torque across the power gearbox 46 recovered or returned to be within the normal operating range 728 during a second normal operation period 878. For example, the torque across the power gearbox 46 is below the normal operating range 728 in the second normal operation period 878. Accordingly, with reference to FIG. 8A, the torque across the power gearbox is within the normal operating range 728 at 840 and the method 800 returns to step 805.

Referring again to FIG. 8A, if the torque across the power gearbox 46 exceeds the mid-torque threshold 823 at 835, the method 800 proceeds to performing the second corrective action at 845. Additionally, if the torque across the power gearbox 46 does not exceed, such as is less than or equal to, the lower torque threshold 708 at 815, the method 800 also proceeds to performing the second corrective action at 845.

In at least one example embodiment, performing the second corrective action at 845 includes performing a plurality of actions. For example, performing the second corrective action at 845 includes reducing the rotational speed of the fan 38 at 850, reducing the supply of fuel to the gas turbine engine 10 at 850, adjusting the pitch of one or more of the fan blades 40 of the fan 38 to a failsafe speed schedule at 855, or a combination thereof. Additionally, performing the second corrective action at 845 may include adjusting a flow of bleed air from a working gas flow path of the gas turbine engine 10 via a variable bleed valve in some example embodiments. After performing the second corrective action at 845, the method 800 proceeds to determining if the torque across the power gearbox 46 exceeds the upper torque threshold 718 at 860.

If the torque across the power gearbox 46 does not exceed the upper torque threshold 718 at 860, the method 800 proceeds to determine if the torque across the power gearbox 46 is within the normal operating range 728 at 870. If the torque across the power gearbox 46 is within the normal operating range 728, at 870, the method 800 returns to step 805. If the torque across the power gearbox 46 is not within the normal operating range 728 at 870, the method 870 returns to performing the second corrective action at 845. Accordingly, the method 800 includes a second iterative loop 885 for reducing the torque across the power gearbox 46 below the upper torque threshold 718 and the lower torque threshold 708.

If the torque across the power gearbox 46 exceeds the upper torque threshold 718 at 860, the method 800 proceeds to reducing the supply of fuel to the gas turbine engine 10 at 865. In at least one example embodiment, reducing the supply of fuel to the gas turbine engine 10 at 865 includes shutting off the supply of fuel to the gas turbine engine 10, as will be discussed in greater detail below with respect to FIG. 8B.

With reference to FIGS. 8B-8C, the torque across the power gearbox 46 may be within the normal operation range 728 or less than or equal to the lower torque threshold 708 within the normal operation period 740. If the torque across the power gearbox 46 exceeds the normal operation range 728 at 810 and exceeds the lower torque threshold 708 at 815, as shown during the first accommodation period 872, the first corrective action may be performed at 820. After performing the first corrective action at 820, and if the torque across the power gearbox 46 does not exceed the mid-torque threshold 823 at 835, the first iterative loop 880 may be repeated until the torque across the power gearbox 46 is within the normal operating range at 840. Accordingly, the torque across the power gearbox 46 may be within the normal operation range 728 within the second normal operation period 878 after the first accommodation period 872, as shown in FIG. 8C.

If the torque across the power gearbox 46 exceeds the mid-torque threshold 823 at 835, the method 800 proceeds to performing the second corrective action at 845. The second corrective action at 835 may be performed during a second accommodation period 874, shown in FIG. 8B. The one or more corrective actions performed during the second accommodation period 874 may require a quicker time constant. For example, such actions may reduce the torque across the power gearbox 46 more quickly than corrective actions performed during the first accommodation period 872.

If the torque across the power gearbox 46 does not exceed the upper torque threshold 718 at 860 after performing the second corrective action at 845, the method 800 proceeds to determining if the torque across the power gearbox 46 is within the normal operating range 728 at 870. If the torque across the power gearbox 46 is within the normal operating range 728 at 870, the method returns to step 805. If the torque across the power gearbox 46 is outside the normal operating range 728 at 870, the second iterative loop 885 may be repeated, such as during the second accommodation period 874, until the torque across the power gearbox 46 is within the normal operating range 728 at 870. For example, after the second accommodation period 874 shown in FIG. 8B, the torque across the power gearbox 46 may be within the normal operating range 728, such as during the second normal operation period 878 shown in FIG. 8C.

If the second iterative loop 885 is performed such that the second corrective action performed at 845 do not reduce the torque across the power gearbox 46 to be within the normal operating range 728 and the torque across the power gearbox 46 exceeds the upper torque threshold 718 at 860, the supply of fuel to the gas turbine engine 10 is reduced at 865. For example, as shown in FIG. 8B, the torque across the power gearbox 46 continues to increase to the upper torque threshold 718, as indicated by the torque line 735, during the second accommodation period 874 despite the supply of fuel being reduced, as indicated by the fuel supply line 745. In response, the supply of fuel to the gas turbine engine 10 may be further reduced at 865. Additionally, or alternatively, the supply of fuel to the gas turbine engine 10 may be shut off to allow the torque across the power gearbox 46 to reduce within a shutdown period 876 of the gas turbine engine 10. For example, as shown in FIG. 8B, the fuel supply line 745 is reduced to about zero (0) between the second accommodation period 874 and the shutdown period 876 and the torque across the power gearbox 46, indicated by torque line 735, decreases during the shutdown period 876.

Figure 9:
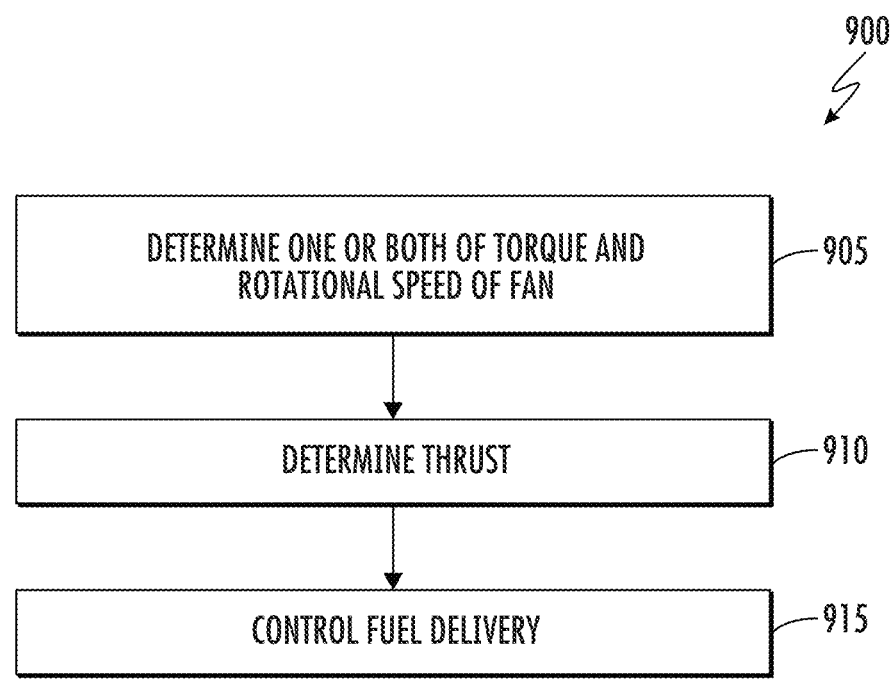
FIG. 9 is a flow diagram of a method for determining torque and thrust within a gas turbine engine in accordance with an exemplary aspect of the present disclosure.

FIG. 9 is a flow diagram of a method 900 for determining torque and thrust within the gas turbine engine 10 in accordance with an exemplary aspect of the present disclosure. The method 900 may be incorporated into the methods 600, 700, 800 described with respect to FIGS. 6A-8C. For example, the method 900 may be used to determine the torque received at step 605 of the method 600, step 705 of the method 700, and step 805 of the method 800.

In at least one example embodiment, the method 900 includes determining the torque across the power gearbox 46 using data indicative of the torque across the power gearbox 46, determining the rotational speed of the fan 38, or both at 905; determining thrust of the gas turbine engine 10 based on one or both of the torque across the power gearbox 46 and the rotational speed of the fan 38 at 910; and controlling the supply of fuel to the gas turbine engine 10 based on the determined thrust at 915.

In at least one example embodiment, the controller 122 is configured to receive the data indicative of the torque across the power gearbox 46. For example, the controller 122 may receive the data indicative of the torque across the power gearbox 46 from the gearbox sensor 112. Additionally, or alternatively, the controller 122 may receive the data indicative of the torque across the power gearbox 46 from another sensor associated with the power gearbox 46 or the gas turbine engine 10. The controller 122 may also be configured to receive the rotational speed of the fan 38. Accordingly, the control system 150 may determine the torque across the power gearbox 46 based on the data indicative of the torque across the power gearbox 46, the rotational speed of the fan 38, or both at 905.

In response to determining the torque across the power gearbox 46 at 905, the control system 150 may determine the thrust of the gas turbine engine 10 at 910. The supply of fuel to the gas turbine engine 10 may be controlled and adjusted at 915 based on the thrust of the gas turbine engine 10. Accordingly, the thrust of the gas turbine engine 10 may be determined and controlled based on the torque applied across the power gearbox 46 by the fan 38.

Figure 10:
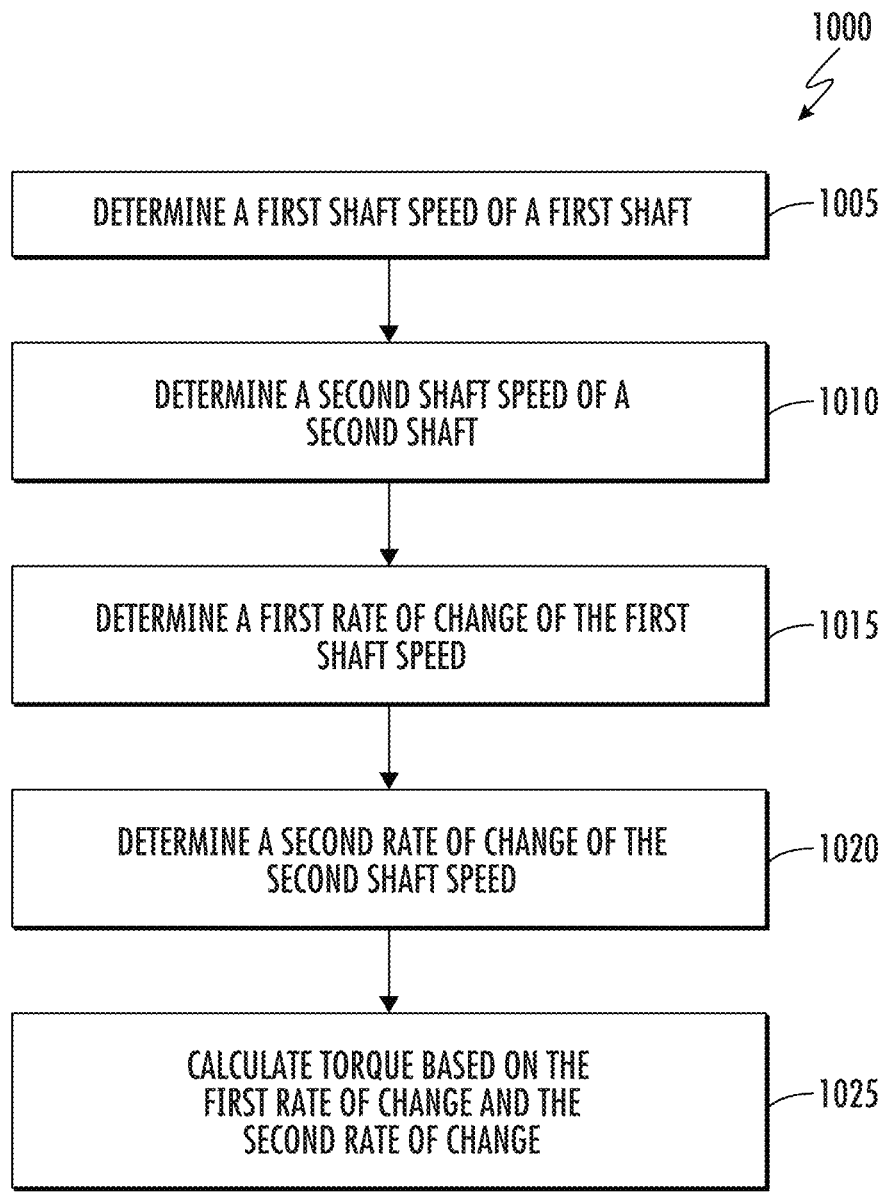
FIG. 10 is a flow diagram of a method for determining torque within a gas turbine engine in accordance with an exemplary aspect of the present disclosure.

FIG. 10 is a flow diagram of a method 1000 for determining torque within the gas turbine engine 10 in accordance with an exemplary aspect of the present disclosure. The method 1000 may be incorporated into the methods 600, 700, 800 described with respect to FIGS. 6A-8C. For example, the method 1000 may be used to determine the torque received at step 605 of the method 600, step 705 of the method 700, and step 805 of the method 800.

In at least one example embodiment, the method 1000 includes determining a first shaft speed of a first shaft at 1005, determining a second shaft speed of a second shaft at 1010, determining a first rate of change of the first shaft speed at 1015, determining a second rate of change of the second shaft speed at 1020, and calculating the torque across the power gearbox 46 based on the first rate of change and the second rate of change at 1025.

In at least one example embodiment, the first shaft includes the fan shaft 44 and the second shaft includes the LP shaft 36. Determining the first shaft speed of the first shaft at 1005 at 1005 may include receiving data indicative of the rotational speed of the fan shaft 44 from a first speed sensor coupled to the fan shaft 44. Additionally, determining the second shaft speed of the second shaft at 1010 may include receiving data indicative of the rotational speed of the LP shaft 36 from a second speed sensor coupled to the LP shaft 36.

In at least one example embodiment, the controller 122 receives the first shaft speed and the second shaft speed from the first speed sensor and the second speed sensor. The control system 150 may determine the first rate of change of the first shaft speed at 1015 and determine the second rate of change of the second shaft speed at 1020 based on the first shaft speed and the second shaft speed, respectively.

The control system 150 may derive the torque across the power gearbox 46 from the first rate of change and the second rate of change at 1025. For example, the control system 150 may calculate a difference between the first rate of change and the second rate of the change to determine the torque across the power gearbox 46. Additionally, or alternatively, the control system 150 may determine a ratio of the first rate of change and the second rate of change. Based on the torque across the power gearbox 46 determined, the control system 150 may adjust the supply of fuel to gas turbine engine 10.

Accordingly, systems and methods for detecting and reducing torque in a gas turbine engine are disclosed herein. For example, torque may be determined across a power gearbox based on a static frame of reference rather than a rotating frame of reference. In some example embodiments, a sensor may be provided adjacent a static side of the power gearbox to measure the torque being reacted by the power gearbox stator side. Such torque measurements may allow for a smaller sensor to be used and, thus, a smaller power gearbox.

Further aspects are provided by the subject matter of the following clauses:

A gas turbine engine, comprising: a fan section comprising a fan rotatable with a fan shaft; a turbomachinery section comprising a turbine and a turbomachine shaft rotatable with the turbine; a power gearbox mechanically coupled to the fan shaft and the turbomachine shaft such that the fan shaft is rotatable by the turbomachine shaft across the power gearbox; a grounded structure coupled to and supporting the power gearbox; and a torque monitoring system comprising a gearbox sensor, the gearbox sensor coupled to the grounded structure, the torque monitoring system configured to determine a torque across the power gearbox using the gearbox sensor.

The gas turbine engine of any of the preceding clauses, wherein the grounded structure is stationary.

The gas turbine engine of any of the preceding clauses, wherein the power gearbox comprises an epicyclical power gearbox or a compound epicyclical power gearbox including a static member coupled to the grounded structure.

The gas turbine engine any of the preceding clauses, wherein the power gearbox comprises: a sun gear including a plurality of teeth, the sun gear drivingly coupled to the turbomachine shaft of the gas turbine engine; a plurality of planet gears circumscribing the sun gear, each of the planet gears including a plurality of teeth meshing with the teeth of the sun gear such that rotation of the sun gear causes rotation of each planet gear of the plurality of planet gears; a ring gear circumscribing the plurality of planet gears, the ring gear including a plurality of teeth meshing with the teeth of each of the planet gears such that the ring gear rotates relative to the plurality of planet gears; and a planet carrier coupled to each planet gear of the plurality of planet gears and to the grounded structure such that the planet carrier supports the power gearbox relative to the grounded structure.

The gas turbine engine of any of the preceding clauses, further comprising: a frame, wherein the grounded structure is coupled to the frame of the gas turbine engine.

The gas turbine engine of any of the preceding clauses, wherein the gearbox sensor is operable to sense data indicative of a deflection of the grounded structure to determine the torque across the power gearbox.

The gas turbine engine of any of the preceding clauses, wherein the planet carrier and the frame are stationary.

The gas turbine engine of any of the preceding clauses, wherein the frame is a forward frame of the gas turbine engine.

The gas turbine engine of any of the preceding clauses, wherein the turbine is a low pressure turbine, wherein the turbomachine shaft is a low pressure shaft.

The gas turbine engine of any of the preceding clauses, wherein the turbomachinery section further comprises a low pressure compressor rotatable with the low pressure shaft.

The gas turbine engine of any of the preceding clauses, wherein the gearbox sensor comprises a load cell, a strain gauge, a torsion tube, or a combination thereof.

The gas turbine engine of any of the preceding clauses, wherein the torque monitoring system comprises a controller, and wherein the controller is operably coupled with the gearbox sensor.

The gas turbine engine of any of the preceding clauses, wherein the controller is configured to: receive data indicative of the torque across the power gearbox; determine the torque across the power gearbox is less than a model torque for the power gearbox using the received data indicative of the torque across the power gearbox; and reduce a supply of fuel to the gas turbine engine in response to determining the torque across the power gearbox is less than the model torque for the power gearbox.

The gas turbine engine of any of the preceding clauses, wherein the data indicative of the torque across the power gearbox is received from the gearbox sensor.

The gas turbine engine of any of the preceding clauses, wherein the model torque is determined based on a function of a speed of the fan shaft, a pitch of blades of the fan, a Mach number, an ambient temperature, an altitude, or a combination thereof.

The gas turbine engine of any of the preceding clauses, wherein: the fan comprises a fixed pitch fan; and the controller is configured to: receive data indicative of the torque across the power gearbox; determine the torque across the power gearbox exceeds a lower torque threshold using the received data indicative of the torque across the power gearbox; perform at least one corrective action in response to determining the torque across the power gearbox exceeds the lower torque threshold; determine the torque across the power gearbox exceeds an upper torque threshold using the received data indicative of the torque across the power gearbox; and reduce a supply of fuel to the gas turbine engine in response to determining the torque across the power gearbox exceeds the upper torque threshold.

The gas turbine engine of any of the preceding clauses, wherein the data indicative of the torque across the power gearbox is received from the gearbox sensor.

The gas turbine engine of any of the preceding clauses, wherein the at least one corrective action includes reducing a rotational speed of the fan shaft, reducing a flow of fuel to the gas turbine engine, or both.

The gas turbine engine of any of the preceding clauses, wherein the controller is further configured to: determine the torque across the power gearbox is less than or equal to the upper torque threshold; and determine the torque across the power gearbox is within a normal operating range using the received data indicative of the torque across the power gearbox in response to determining the torque across the power gearbox is less than or equal to the upper torque threshold.

The gas turbine engine of any of the preceding clauses, wherein the controller is further configured to: determine the torque across the power gearbox is less than or equal to the upper torque threshold; determine the torque across the power gearbox is outside a normal operating range using the received data indicative of the torque across the power gearbox in response to determining the torque across the power gearbox is less than or equal to the upper torque threshold; and perform the at least one corrective action in response to determining the torque across the power gearbox is outside the normal operating range.

The gas turbine engine of any of the preceding clauses, wherein the lower torque threshold is above the normal operating range, and wherein the upper torque threshold is above the lower torque threshold.

The gas turbine engine of any of the preceding clauses, wherein: the fan comprises a variable pitch fan; and the controller is configured to: receive data indicative of the torque across the power gearbox; determine the torque across the power gearbox exceeds a normal operating range using the received data indicative of the torque across the power gearbox; in response to determining that the torque across the power gearbox exceeds the normal operating range, determine the torque across the power gearbox exceeds a lower torque threshold using the received data indicative of the torque across the power gearbox; in response to determining that the torque across the power gearbox exceeds the lower torque threshold, perform a first corrective action; and in response to determining that the torque across the power gearbox is less than or equal to the lower torque threshold, perform a second corrective action.

The gas turbine engine of any of the preceding clauses, wherein the data indicative of the torque across the power gearbox is received from the gearbox sensor.

The gas turbine engine of any of the preceding clauses, wherein: the first corrective action comprises adjusting a pitch of one or more blades of the fan, increasing a rotational speed of the fan, or both; and the second corrective action comprises reducing the rotational speed of the fan, reducing a flow of fuel to the gas turbine engine, adjusting the pitch of the one or more blades of the fan to a failsafe speed schedule, adjusting a flow of bleed air from a working gas flow path of the gas turbine engine via a variable bleed valve, or a combination thereof.

The gas turbine engine of any of the preceding clauses, wherein, in response to determining that the torque across the power gearbox exceeds the lower torque threshold, the controller is further configured to: determine the torque across the power gearbox is less than or equal to a mid-torque threshold; and in response to determining the torque across the power gearbox is less than or equal to the mid-torque threshold, determine the torque across the power gearbox is within the normal operating range.

The gas turbine engine of any of the preceding clauses, wherein, in response to determining the torque across the power gearbox is less than or equal to the mid-torque threshold, the controller is further configured to: determine the torque across the power gearbox is outside the normal operating range; perform the first corrective action; determine the torque across the power gearbox is less than or equal to the mid-torque threshold; and in response to determining the torque across the power gearbox is less than or equal to the mid-torque threshold, determine the torque across the power gearbox is within the normal operating range.

The gas turbine engine of any of the preceding clauses, wherein, the controller is further configured to: determine the torque across the power gearbox exceeds the mid-torque threshold; and in response to the torque across the power gearbox exceeding the mid-torque threshold, perform the second corrective action, determine the torque across the power gearbox is less than or equal to an upper torque threshold, and in response to the torque across the power gearbox being less than or equal to the upper torque threshold, determine the torque across the power gearbox is within the normal operating range.

The gas turbine engine of any of the preceding clauses, wherein, the controller is further configured to: determine the torque across the power gearbox exceeds the upper torque threshold; and in response to the torque across the power gearbox exceeding the upper torque threshold, reduce a flow of fuel to the gas turbine engine.

The gas turbine engine of any of the preceding clauses, wherein, in response to the torque across the power gearbox being less than or equal to the upper torque threshold, the controller is further configured to: determine the torque across the power gearbox outside the normal operating range; and in response to determining the torque across the power gearbox is outside the normal operating range, perform the second corrective action, determine the torque across the power gearbox is less than or equal to the upper torque threshold, and in response to the torque across the power gearbox being less than or equal to the upper torque threshold, determine the torque across the power gearbox is within the normal operating range.

The gas turbine engine any of the preceding clauses, wherein, in response to determining that the torque across the power gearbox is less than or equal to the lower torque threshold and performing the second corrective action, the controller is further configured to: determine the torque across the power gearbox is less than or equal to an upper torque threshold; and in response to the torque across the power gearbox being less than or equal to the upper torque threshold, determine the torque across the power gearbox is within the normal operating range.

The gas turbine engine of any of the preceding clauses, wherein, the controller is further configured to: determine the torque across the power gearbox exceeds the upper torque threshold; and in response to the torque across the power gearbox exceeding the upper torque threshold, reduce a flow of fuel to the gas turbine engine.

The gas turbine engine of any of the preceding clauses, wherein, the controller is further configured to: determine the torque across the power gearbox is outside the normal operating range; and in response to determining the torque across the power gearbox is outside the normal operating range, reduce a rotational speed of the fan, reduce a flow of fuel to the gas turbine engine, or both reduce the rotational speed of the fan and reduce the flow of fuel to the gas turbine engine, adjust a pitch of one or more blades of the fan to a failsafe speed schedule, determine the torque across the power gearbox is less than or equal to the upper torque threshold, and in response to the torque across the power gearbox being less than or equal to the upper torque threshold, determine the torque across the power gearbox is healthy.

The gas turbine engine of any of the preceding clauses, wherein the controller is configured to: determine the torque across the power gearbox using data indicative of the torque across the power gearbox, determine a rotational speed of the fan, or both determine the torque across the power gearbox and determine the rotational speed of the fan; determine thrust based on one or both of the torque across the power gearbox and the rotational speed of the fan; and control a flow of fuel to the gas turbine engine based on the determined thrust.

The gas turbine engine of any of the preceding clauses, wherein the controller is configured to receive the data indicative of the torque across the power gearbox from the gearbox sensor.

A method for operating a gas turbine engine including a fan section having a fan rotatable with a fan shaft, a turbomachinery section having a turbine and a turbomachine shaft rotatable with the turbine, and a power gearbox mechanically coupled to the fan shaft and the turbomachine shaft, the method comprising: receiving data indicative of a torque across the power gearbox of the gas turbine engine; determining the torque across the power gearbox is less than a model torque for the power gearbox using the data indicative of the torque across the power gearbox; and reducing a supply of fuel to the gas turbine engine in response to determining the torque across the power gearbox is less than the model torque for the power gearbox.

The method of any of the preceding clauses, wherein the determining the torque across the power gearbox comprises: determining a first shaft speed of a first shaft; determining a second shaft speed of a second shaft; determining a first rate of change of the first shaft speed; determining a second rate of change of the second shaft speed; and calculating the torque across the power gearbox based on the first rate of change and the second rate of change.

The method of any of the preceding clauses, wherein: the first shaft comprises the fan shaft; and the second shaft comprises the turbomachine shaft.

The method of any of the preceding clauses, wherein the determining the torque across the power gearbox comprises: receiving data indicative of the torque from a gearbox sensor of a torque monitoring system, the gearbox sensor coupled to a grounded structure of the gas turbine engine, the grounded structure coupled to and supporting the power gearbox.

A method for a gas turbine engine including a fan section having a fan rotatable with a fan shaft, a turbomachinery section having a turbine and a turbomachine shaft rotatable with the turbine, and a power gearbox mechanically coupled to the fan shaft and the turbomachine shaft, the method comprising: determining, using data indicative of a torque across the power gearbox, that the torque across the power gearbox is greater than a lower torque threshold; performing at least one corrective action in response to determining the torque across the power gearbox exceeds the lower torque threshold; determining the torque across the power gearbox exceeds an upper torque threshold using the data indicative of the torque across the power gearbox; and reducing a supply of fuel to the gas turbine engine in response to determining the torque across the power gearbox exceeds the upper torque threshold.

The method of any of the preceding clauses, wherein the fan comprises a fixed pitch fan.

The method of any of the preceding clauses, wherein the at least one corrective action comprises reducing a rotational speed of the fan shaft, reducing a flow of fuel to the gas turbine engine, or both.

The method of any of the preceding clauses, further comprising: determining the torque across the power gearbox is less than or equal to the upper torque threshold; and determining the torque across the power gearbox is within a normal operating range using the data indicative of the torque across the power gearbox in response to determining the torque across the power gearbox is less than or equal to the upper torque threshold.

The method of any of the preceding clauses, wherein the lower torque threshold is above the normal operating range, and wherein the upper torque threshold is above the lower torque threshold.

The method of any of the preceding clauses, further comprising: determining the torque across the power gearbox is less than or equal to the upper torque threshold; determining the torque across the power gearbox is outside a normal operating range using the data indicative of the torque across the power gearbox in response to determining the torque across the power gearbox is less than or equal to the upper torque threshold; and performing the at least one corrective action in response to determining the torque across the power gearbox is outside the normal operating range.

The method of any of the preceding clauses, wherein: the at least one corrective action includes a first corrective action and a second corrective action; and the method further comprises: determining the torque across the power gearbox exceeds a normal operating range using the data indicative of the torque across the power gearbox, in response to determining that the torque across the power gearbox exceeds the normal operating range, determining the torque across the power gearbox exceeds the lower torque threshold using the data indicative of the torque across the power gearbox, in response to determining the torque across the power gearbox exceeds the lower torque threshold, performing the first corrective action, and in response to determining the torque across the power gearbox is less than or equal to the lower torque threshold, performing the second corrective action.

The method of any of the preceding clauses, wherein the fan comprises a variable pitch fan.

The method of any of the preceding clauses, wherein: the first corrective action comprises adjusting a pitch of one or more blades of the fan, increasing a rotational speed of the fan, or both; and the second corrective action comprises reducing the rotational speed of the fan, reducing a flow of fuel to the gas turbine engine, adjusting the pitch of the one or more blades of the fan to a failsafe speed schedule, or a combination thereof.

The method of any of the preceding clauses, further comprising: in response to performing the first corrective action, determining the torque across the power gearbox is less than or equal to a mid-torque threshold; and in response to determining the torque across the power gearbox is less than or equal to the mid-torque threshold, determining the torque across the power gearbox is within the normal operating range.

The method of any of the preceding clauses, wherein, in response to determining the torque across the power gearbox is less than or equal to the mid-torque threshold, the method further comprising: determining the torque across the power gearbox is outside the normal operating range; performing the first corrective action; determining the torque across the power gearbox is less than or equal to the mid-torque threshold; and in response to determining the torque across the power gearbox is less than or equal to the mid-torque threshold, determining the torque across the power gearbox is within the normal operating range.

The method of any of the preceding clauses, further comprising: determining the torque across the power gearbox exceeds the mid-torque threshold; performing the second corrective action; determining the torque across the power gearbox is less than or equal to the upper torque threshold; and in response to determining the torque across the power gearbox is less than or equal to the upper torque threshold, determining the torque across the power gearbox is within the normal operating range.

The method of any of the preceding clauses, further comprising: determining the torque across the power gearbox exceeds the upper torque threshold; and reducing a flow of fuel to the gas turbine engine.

The method of any of the preceding clauses, wherein the lower torque threshold is above the normal operating range, the mid-torque threshold is above the lower torque threshold, and wherein the upper torque threshold is above the mid-torque threshold.

The method of any of the preceding clauses, further comprising: determining the torque across the power gearbox is outside the normal operating range; performing the second corrective action in response to determining the torque across the power gearbox is outside the normal operating range; determining the torque across the power gearbox is less than or equal to the upper torque threshold; and in response to the torque across the power gearbox being less than or equal to the upper torque threshold, determining the torque across the power gearbox is within the normal operating range.

The method of any of the preceding clauses, further comprising: in response to performing the second corrective action, determining the torque across the power gearbox is less than or equal to the upper torque threshold; and in response to the torque across the power gearbox being less than or equal to the upper torque threshold, determining the torque across the power gearbox is within the normal operating range.

The method of any of the preceding clauses, further comprising: in response to the torque across the power gearbox being less than or equal to the upper torque threshold, determining the torque across the power gearbox is outside the normal operating range; performing the second corrective action; determining the torque across the power gearbox is less than or equal to the upper torque threshold; and in response to the torque across the power gearbox being less than or equal to the upper torque threshold, determining the torque across the power gearbox is within the normal operating range.

The method of any of the preceding clauses, further comprising: in response to performing the second corrective action, determining the torque across the power gearbox exceeds the upper torque threshold; and in response to the torque across the power gearbox exceeding the upper torque threshold, reducing a flow of fuel to the gas turbine engine.

The method of any of the preceding clauses, wherein determining the torque across the power gearbox comprises: determining a first shaft speed of a first shaft; determining a second shaft speed of a second shaft; determining a first rate of change of the first shaft speed; determining a second rate of change of the second shaft speed; and calculating the torque across the power gearbox based on the first rate of change and the second rate of change.

The method of any of the preceding clauses, wherein: the first shaft comprises the fan shaft; and the second shaft comprises the turbomachine shaft.

The method of any of the preceding clauses, wherein receiving data indicative of the torque across the power gearbox comprises: receiving data indicative of the torque across the power gearbox from a gearbox sensor of a torque monitoring system, the gearbox sensor coupled to a grounded structure of the gas turbine engine, the grounded structure coupled to and supporting the power gearbox.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine, comprising:
a fan section comprising a fan rotatable with a fan shaft;
a turbomachinery section comprising a turbine and a turbomachine shaft rotatable with the turbine;
a power gearbox mechanically coupled to the fan shaft and the turbomachine shaft such that the fan shaft is rotatable by the turbomachine shaft across the power gearbox;
a grounded structure coupled to and supporting the power gearbox;
a torque monitoring system comprising a gearbox sensor, the gearbox sensor coupled to the grounded structure, the torque monitoring system configured to determine a torque across the power gearbox using the gearbox sensor; and
a controller operably coupled with the gearbox sensor, the controller configured to:
determine a model torque based on received data indicative of one or more of a speed of the fan shaft, a pitch of fan blades of the fan, a Mach number of an aircraft in which the gas turbine engine is installed, an ambient temperature, or an altitude of the aircraft;
receive data indicative of the torque across the power gearbox;
determine the torque across the power gearbox is below the model torque using the received data indicative of the torque across the power gearbox; and
reduce a supply of fuel to the gas turbine engine in response to determining the torque across the power gearbox is below the model torque.

2. The gas turbine engine of claim 1, wherein the power gearbox comprises an epicyclical power gearbox or a compound epicyclical power gearbox including a static member coupled to the grounded structure.

3. The gas turbine engine of claim 1, wherein the power gearbox comprises:
a sun gear including a plurality of teeth, the sun gear drivingly coupled to the turbomachine shaft of the gas turbine engine;
a plurality of planet gears circumscribing the sun gear, each of the planet gears including a plurality of teeth meshing with the teeth of the sun gear such that rotation of the sun gear causes rotation of each planet gear of the plurality of planet gears;
a ring gear circumscribing the plurality of planet gears, the ring gear including a plurality of teeth meshing with the teeth of each of the planet gears such that the ring gear rotates relative to the plurality of planet gears; and
a planet carrier coupled to each planet gear of the plurality of planet gears and to the grounded structure such that the planet carrier supports the power gearbox relative to the grounded structure.

4. The gas turbine engine of claim 3, further comprising:
a frame, wherein the grounded structure is coupled to the frame of the gas turbine engine.

5. The gas turbine engine of claim 4, wherein the gearbox sensor is operable to sense data indicative of a deflection of the grounded structure to determine the torque across the power gearbox.

6. The gas turbine engine of claim 1, wherein the controller is operably coupled with the gearbox sensor.

7. The gas turbine engine of claim 6, wherein:
the fan comprises a fixed pitch fan; and
the controller is further configured to:
receive data indicative of the torque across the power gearbox;
determine the torque across the power gearbox exceeds a lower torque threshold using the received data indicative of the torque across the power gearbox;
perform at least one corrective action in response to determining the torque across the power gearbox exceeds the lower torque threshold;
determine the torque across the power gearbox exceeds an upper torque threshold using the received data indicative of the torque across the power gearbox; and
reduce the supply of fuel to the gas turbine engine in response to determining the torque across the power gearbox exceeds the upper torque threshold.

8. The gas turbine engine of claim 7, wherein the at least one corrective action includes reducing a rotational speed of the fan shaft, reducing a flow of fuel to the gas turbine engine, or both.

9. The gas turbine engine of claim 7, wherein the controller is further configured to:
determine the torque across the power gearbox is less than or equal to the upper torque threshold; and
determine the torque across the power gearbox is within a normal operating range using the received data indicative of the torque across the power gearbox in response to determining the torque across the power gearbox is less than or equal to the upper torque threshold.

10. The gas turbine engine of claim 7, wherein the controller is further configured to:
determine the torque across the power gearbox is less than or equal to the upper torque threshold;
determine the torque across the power gearbox is outside a normal operating range using the received data indicative of the torque across the power gearbox in response to determining the torque across the power gearbox is less than or equal to the upper torque threshold; and
perform the at least one corrective action in response to determining the torque across the power gearbox is outside the normal operating range.

11. The gas turbine engine of claim 6, wherein:
the fan comprises a variable pitch fan; and
the controller is configured to:
receive data indicative of the torque across the power gearbox;
determine the torque across the power gearbox exceeds a normal operating range using the received data indicative of the torque across the power gearbox;
in response to determining that the torque across the power gearbox exceeds the normal operating range, determine the torque across the power gearbox exceeds a lower torque threshold using the received data indicative of the torque across the power gearbox;
in response to determining that the torque across the power gearbox exceeds the lower torque threshold, perform a first corrective action; and
in response to determining that the torque across the power gearbox is less than or equal to the lower torque threshold, perform a second corrective action.

12. The gas turbine engine of claim 11, wherein:
the first corrective action comprises adjusting the pitch of one or more of the fan blades of the fan, increasing a rotational speed of the fan, or both; and
the second corrective action comprises reducing the rotational speed of the fan, reducing a flow of fuel to the gas turbine engine, adjusting the pitch of the one or more fan blades of the fan to a failsafe speed schedule, adjusting a flow of bleed air from a working gas flow path of the gas turbine engine via a variable bleed valve, or a combination thereof.

13. The gas turbine engine of claim 11, wherein, in response to determining that the torque across the power gearbox exceeds the lower torque threshold, the controller is further configured to:
determine the torque across the power gearbox is less than or equal to a mid-torque threshold; and
in response to determining the torque across the power gearbox is less than or equal to the mid-torque threshold, determine the torque across the power gearbox is within the normal operating range.

14. The gas turbine engine of claim 13, wherein, in response to determining the torque across the power gearbox is less than or equal to the mid-torque threshold, the controller is further configured to:
determine the torque across the power gearbox is outside the normal operating range;
perform the first corrective action;
determine the torque across the power gearbox is less than or equal to the mid-torque threshold; and
in response to determining the torque across the power gearbox is less than or equal to the mid-torque threshold, determine the torque across the power gearbox is within the normal operating range.

15. The gas turbine engine of claim 13, wherein, the controller is further configured to:
determine the torque across the power gearbox exceeds the mid-torque threshold; and
in response to the torque across the power gearbox exceeding the mid-torque threshold, perform the second corrective action,
determine the torque across the power gearbox is less than or equal to an upper torque threshold, and
in response to the torque across the power gearbox being less than or equal to the upper torque threshold, determine the torque across the power gearbox is within the normal operating range.

16. The gas turbine engine of claim 11, wherein, in response to determining that the torque across the power gearbox is less than or equal to the lower torque threshold and performing the second corrective action, the controller is further configured to:
determine the torque across the power gearbox is less than or equal to an upper torque threshold; and
in response to the torque across the power gearbox being less than or equal to the upper torque threshold, determine the torque across the power gearbox is within the normal operating range.

17. The gas turbine engine of claim 16, wherein, the controller is further configured to:
determine the torque across the power gearbox exceeds the upper torque threshold; and
in response to the torque across the power gearbox exceeding the upper torque threshold, reduce a flow of fuel to the gas turbine engine.

18. The gas turbine engine of claim 16, wherein, the controller is further configured to:
determine the torque across the power gearbox is outside the normal operating range; and
in response to determining the torque across the power gearbox is outside the normal operating range,
reduce a rotational speed of the fan, reduce a flow of fuel to the gas turbine engine, or both reduce the rotational speed of the fan and reduce the flow of fuel to the gas turbine engine,
adjust a pitch of one or more blades of the fan to a failsafe speed schedule,
determine the torque across the power gearbox is less than or equal to the upper torque threshold, and
in response to the torque across the power gearbox being less than or equal to the upper torque threshold, determine the torque across the power gearbox is healthy.

19. A method for a gas turbine engine including a fan section having a fan rotatable with a fan shaft, a turbomachinery section having a turbine and a turbomachine shaft rotatable with the turbine, and a power gearbox mechanically coupled to the fan shaft and the turbomachine shaft, the method comprising:
- determining a model torque based on received data indicative of one or more of a speed of the fan shaft, a pitch of fan blades of the fan, a Mach number of an aircraft in which the gas turbine engine is installed, an ambient temperature, or an altitude of the aircraft;
- receiving data indicative of a torque across the power gearbox;
- determining the torque across the power gearbox is below the model torque using the received data indicative of the torque across the power gearbox; and
- reducing a supply of fuel to the gas turbine engine in response to determining the torque across the power gearbox is below the model torque.

20. The method of claim 19, wherein receiving data indicative of the torque across the power gearbox comprises:
- receiving data indicative of the torque across the power gearbox from a gearbox sensor of a torque monitoring system, the gearbox sensor coupled to a grounded structure of the gas turbine engine, the grounded structure coupled to and supporting the power gearbox.

* * * * *